United States Patent
Varentsov et al.

(10) Patent No.: US 11,755,348 B1
(45) Date of Patent: Sep. 12, 2023

(54) DIRECT AND PROXY REMOTE FORM CONTENT PROVISIONING METHODS AND SYSTEMS

(71) Applicant: PARALLELS INTERNATIONAL GmbH, Schaffhausen (CH)

(72) Inventors: Dmitry Varentsov, Moscow (RU); Ivan Korobov, Moscow (RU); Sergey Ivanov, Moscow (RU); Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 0 days.

(21) Appl. No.: 17/069,182

(22) Filed: Oct. 13, 2020

(51) Int. Cl.
  *G06F 9/451* (2018.01)
  *G06F 3/0484* (2022.01)
  *G06F 3/0482* (2013.01)

(52) U.S. Cl.
  CPC .......... *G06F 9/452* (2018.02); *G06F 3/0482* (2013.01); *G06F 3/0484* (2013.01)

(58) Field of Classification Search
  CPC ....... G06F 9/452; G06F 3/0484; G06F 3/0482
  See application file for complete search history.

(56) References Cited

U.S. PATENT DOCUMENTS

| | | | | |
|---|---|---|---|---|
| 6,240,414 B1* | 5/2001 | Beizer | ................ | G06F 16/1787 |
| 7,305,129 B2* | 12/2007 | Chellapilla | ........... | G06F 40/174 |
| | | | | 382/174 |
| 2003/0140053 A1* | 7/2003 | Vasey | ................... | G06F 40/103 |
| 2007/0168382 A1* | 7/2007 | Tillberg | ............. | G06K 9/00449 |
| 2014/0095666 A1* | 4/2014 | Yampanis | ........... | G06F 16/9574 |
| | | | | 709/219 |
| 2014/0281871 A1* | 9/2014 | Brunner | ............. | G06K 9/00483 |
| | | | | 715/226 |
| 2018/0337918 A1* | 11/2018 | Chang | ..................... | H04L 63/08 |

* cited by examiner

Primary Examiner — Michael Roswell
(74) Attorney, Agent, or Firm — Rosenberg, Klein & Lee

(57) ABSTRACT

Text entry is a significant part of human-computer interactions. Software application vendors have sought to minimize time spent on repeated input of defined information. However, such approaches have limitations which the inventors have addressed such that field population is contextually aware either so that specific sets of user entered data are not accessible in all situations, only specific sets of user entered data are accessible in all situations, sensitive data is automatically removed from data being stored and a specific set of data to be employed based upon a context of the user and/or software application. Further, enhancements to address the additional complexities of remote clients are presented allowing a filling or auto-fill process to follow the program rules, follow text attributes etc. whilst supporting input from different sources such as a keyboard (physical or virtual), human interface devices (HIDs), clipboard(s), another remote client or virtual device.

16 Claims, 14 Drawing Sheets

DIRECT AND PROXY REMOTE FORM CONTENT PROVISIONING METHODS AND SYSTEMS

FIELD OF THE INVENTION

This patent application relates to electronic content and more particularly to methods and systems for the initial population and subsequent automated population of text entry fields, forms, and other elements within graphical user interfaces in direct remote access sessions and proxy remote access sessions to address restrictions arising from mobile applications.

BACKGROUND OF THE INVENTION

The entry of text is a significant part, albeit at times tedious or boring part, of a human-computer communication or interaction. Software application vendors have sought to minimize time spent on those aspects requiring repeated input of defined information such as when entering access credentials or filling in forms, for example. These include software based means to automatically complete a form within a single software application, automatic filling (auto-filling) and password managers. Some software applications such as web browsers incorporate software plugins to ease repeated form filling via auto-filling where a form requires the user to input previously entered and cached data. Mobile devices and remote input add further limitations as the device to host connection can be lost and if a first session is interrupted reconnection for a second session will typically mean that the previously entered data is lost to the user.

However, auto-filling software applications work with their local forms and their text fields only because of security rules. Accordingly, Program A does not share data with Program B. Auto-filling within web browsers whilst allowing field auto-fill within directly accessed websites is "dumb" such that if a user has cached two sets of data with their name in common the auto-fill is whichever set of data the user chooses which may lead to the user having to remove entries, enter new text etc. or reload the form and select the other set of data. This gets progressively worse as multiple sets of data are cached for a user. Further, inappropriate user selections can lead to sensitive data being cached and accessible for use by anyone on that computer where the data is cached.

Accordingly, it would be beneficial for an auto-fill to be contextually aware either so that specific sets of user entered data are not accessible in all situations, only specific sets of user entered data are accessible in all situations, sensitive data is automatically removed from data being stored and a specific set of data to be employed based upon a context of the user and/or software application.

Further, remote sessions overlay another level of complexity as the remote client is now trying to acquire the entered data making it difficult for the remote client to collect all the user input as it should follow all the rules of the program and follow text attributes. This complexity is further increased as the input may be from different sources such as physical keyboard(s), virtual keyboard(s), a human interface device (HID), clipboard(s), other remote client(s) and virtual device(s), again with the acquiring remote client knowing all the rules of the tracked programs.

Accordingly, it would be beneficial to provide software application vendors and therein their users with a capture methodology which allows capture from these disparate sources.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to electronic content and more particularly to methods and systems for the initial population and subsequent automated population of text entry fields, forms, and other elements within graphical user interfaces in direct remote access sessions and proxy remote access sessions to address restrictions arising from mobile applications.

In accordance with an embodiment of the invention there is provided a method of populating field within a software application comprising:
a) establishing a remote session upon a remote system from a local electronic device associated with a user via a communications network, the remote session relating to a software application;
b) establishing a graphical user interface (GUI) to be rendered to the user upon the local electronic device in dependence upon data provided by the remote session, the GUI comprising a plurality of fields within which text is to be entered; and
c) executing a first process to provide entered text into the plurality of fields to the remote system.

In accordance with an embodiment of the invention there is provided a method of populating field within a software application comprising:
a) establishing a remote session upon a remote system from a local electronic device associated with a user via a communications network, the remote session relating to a software application;
b) establishing a graphical user interface (GUI) to be rendered to the user upon the local electronic device in dependence upon data provided by the remote session, the rendered GUI comprising a plurality of fields within which text is to be entered;
c) executing a first process to provide identify a plurality of fields for which content entry by the user is required by the remote system; and
d) executing a second process to provide the content entry for the plurality of fields.

In accordance with an embodiment of the invention there is provided a method of populating field within a software application comprising:
a) establishing a first remote session upon a remote system from a local electronic device associated with a user via a communications network, the first remote session relating to a first software application;
b) rendering a graphical user interface (GUI) to the user upon the local electronic device in dependence upon data provided by the first remote session, the first rendered GUI comprising a plurality of first fields within which text is to be entered;
c) executing a first process to provide entered text into the plurality of first fields to the remote system; and
d) executing a second process to store a first portion of the entered text into a memory for subsequent retrieval and use in entering text into a plurality of second fields within a second rendered GUI in a second remote session relating to a second software application.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
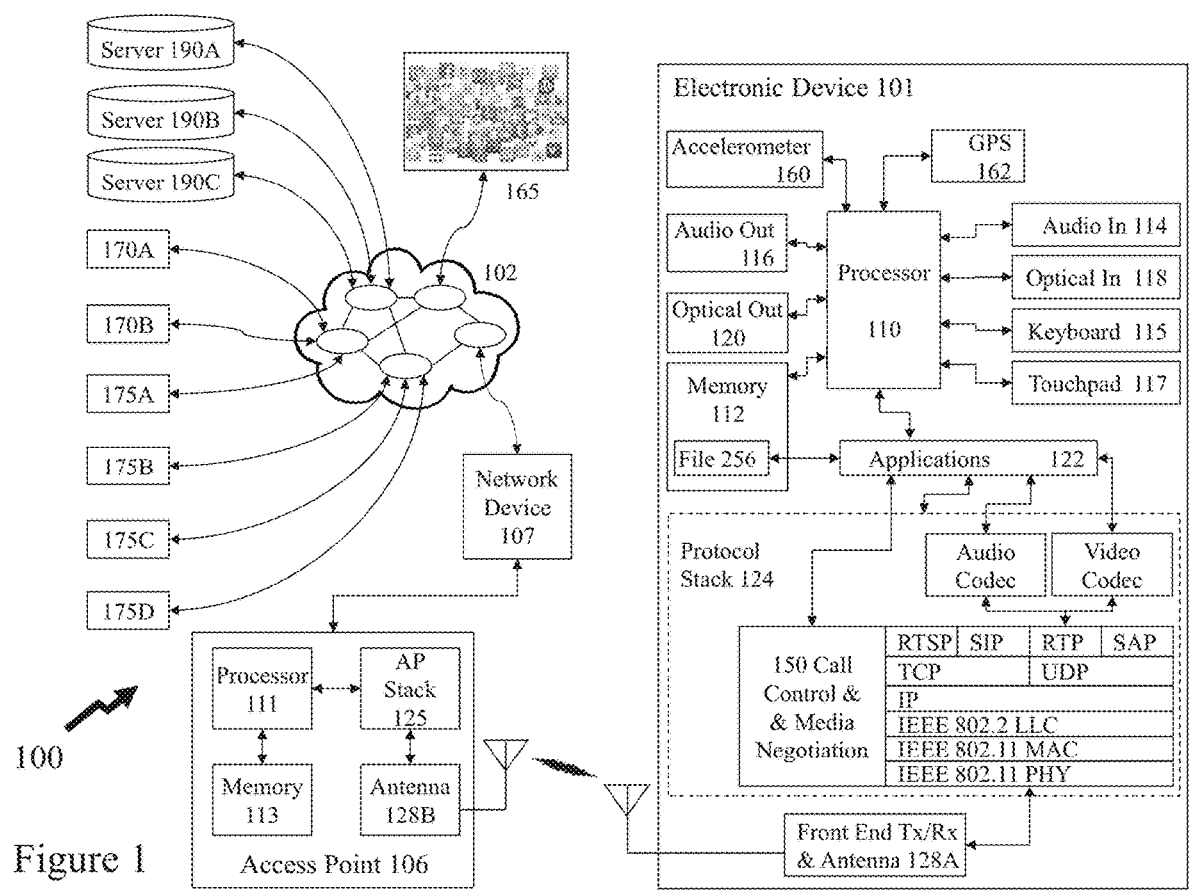
FIG. 1 depicts an exemplary electronic device and network supporting embodiments of the invention.

The present description is directed to electronic content and more particularly to methods and systems for the initial population and subsequent automated population of text entry fields, forms, and other elements within graphical user interfaces in direct remote access sessions and proxy remote access sessions to address restrictions arising from mobile applications.

The ensuing description provides representative embodiment(s) only, and is not intended to limit the scope, applicability, or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers, or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein may refer to, but is not limited to, a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device, and an electronic reader.

A "fixed electronic device" (FED) as used herein may refer to, but is not limited to, a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "wearable device" or "wearable sensor" (Wearable Device) as used herein may refer to, but is not limited to, an electronic device that is worn by a user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

A "client device" as used herein may refer to, but is not limited to, a PED, FED or Wearable Device upon which a user can access directly a file or files which are stored locally upon the PED, FED or Wearable Device, which are referred to as "local files", and/or a file or files which are stored remotely to the PED, FED or Wearable Device, which are referred to as "remote files", and accessed through one or more network connections or interfaces to a storage device.

A "server" as used herein may refer to, but is not limited to, one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

A "software application" (commonly referred to as an "application" or "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "graphical user interface" (GUI) as used herein may refer to, but is not limited to, a form of user interface for a PED, FED, Wearable Device, software application or operating system which allows a user to interact through graphical icons with or without an audio indicator for the selection of features, actions, etc. rather than a text-based user interface, a typed command label or text navigation.

An "enterprise" as used herein may refer to, but is not limited to, a provider of a service and/or a product to a user, customer, or consumer and may include, but is not limited to, a retailer, an online retailer, a market, an online marketplace, a manufacturer, a utility, a Government organization, a service provider, and a third party service provider.

A "service provider" as used herein may refer to, but is not limited to, a provider of a service and/or a product to an enterprise and/or individual and/or group of individuals and/or a device comprising a microprocessor.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of organizations, men, and women. In its broadest sense the user may further include, but not be limited to, software systems, mechanical systems, robotic systems, android systems, etc. that may be characterised by an ability to exploit one or more embodiments of the invention. A user may also be associated through one or more accounts and/or profiles with one or more of a service provider, third party provider, enterprise, social network, social media etc. via a dashboard, web service, website, software plug-in, software application, and graphical user interface.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed, or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein may refer to, but is not limited to, a computer and/or microprocessor readable data file comprising data relating to settings and/or limits of an adult device. Such profiles may be established by a manufacturer/supplier/provider of a device, service, etc. or they may be established by a user through a user interface for a device, a service or a PED/FED in communication with a device, another device, a server or a service provider etc.

A "computer file" (commonly known as a file) as used herein may refer to, but is not limited to, a computer resource for recording data discretely in a computer storage device, this data being electronic content. A file may be defined by one of different types of computer files, designed for different purposes. A file can be opened, read, modified, copied, and closed with one or more software applications an arbitrary number of times. Typically, files are organized in a file system which can be used on numerous different types of storage device exploiting different kinds of media which keeps track of where the files are located on the storage device(s) and enables user access. The format of a file is typically defined by its content since a file is solely a container for data, although, on some platforms the format is usually indicated by its filename extension, specifying the rules for how the bytes must be organized and interpreted meaningfully.

A "local file" as used herein may refer to, but is not limited to, a file, i.e. electronic content, which is stored directly upon a client device, e.g. a PED, FED, or Wearable Device, within a file system of a client device.

A "remote file" as used herein may refer to, but is not limited to, a file, i.e. electronic content, which is stored externally to a client's device and is accessible either through the file system of the client device or through exploitation of one or more protocols for providing a client device with shared file access to the file stored upon a remote storage device. Storing externally to a client's device may include, but not be limited to, storing one or more files on a removable memory storage device which can be connected to the client device, for example a Universal Serial Bus memory (commonly referred to as a memory stick) or an external drive (e.g. external hard disk drive (HDD)) coupled to a wired or wireless interface of the client device. A remote storage device may include, but not be limited to, a remote HDD accessible to the client device via a network, a cloud storage account or cloud storage server accessible via a network (e.g. the Internet, Local Area Network (LAN), etc.) a remote server accessible via a network (e.g. via Ethernet, Wi-Fi, etc.).

"Metadata" as used herein may refer to, but is not limited to, information stored as data that provides information about other data and may include, but not limited to, descriptive metadata, structural metadata, administrative metadata, reference metadata and statistical metadata. Descriptive metadata may describe a resource for purposes such as discovery and identification and may include, but not be limited to, elements such as title, abstract, author, and keywords. Structural metadata relates to containers of data and indicates how compound objects are assembled and may include, but not be limited to, how pages are ordered to form chapters, and typically describes the types, versions, relationships, and other characteristics of digital materials. Administrative metadata may provide information employed in managing a resource and may include, but not be limited to, when and how it was created, file type, technical information, and who can access it. Reference metadata may describe the contents and quality of statistical data whereas statistical metadata may also describe processes that collect, process, or produce statistical data. Statistical metadata may also be referred to as process data.

A "wireless interface" as used herein may refer to, but is not limited to, an interface for a PED, FED, or Wearable Device which exploits electromagnetic signals transmitted through the air. Typically, a wireless interface may exploit microwave signals and/or RF signals, but it may also exploit visible optical signals, infrared optical signals, acoustic signals, optical signals, ultrasound signals, hypersound signals, etc.

A "wired interface" as used herein may refer to, but is not limited to, an interface for a PED, FED, or Wearable Device which exploits electrical signals transmitted through an electrical cable or cables. Typically, a wired interface involves a plug or socket on the electronic device which interfaces to a matching socket or plug on the electrical cable(s). An electrical cable may include, but not be limited, coaxial cable, an electrical mains cable, an electrical cable for serial communications, an electrical cable for parallel communications comprising multiple signal lines, etc.

A "geofence" as used herein may refer to, but is not limited to, a virtual perimeter for a real-world geographic area which can be statically defined or dynamically generated such as in a zone around a PED's location. A geofence may be a predefined set of boundaries which align with a real-world boundary, e.g. state line, country etc., or generated boundary such as a school zone, neighborhood, etc. A geofence may be defined also by an electronic device's ability to access one or more other electronic devices, e.g. beacons, wireless antennas etc.

An "artificial intelligence system" (referred to hereafter as artificial intelligence, AI) as used herein may refer to, but is not limited to, machine intelligence or machine learning in contrast to natural intelligence. An AI may refer to analytical, human inspired, or humanized artificial intelligence. An AI may refer to the use of one or more machine learning algorithms and/or processes. An AI may employ one or more of an artificial network, decision trees, support vector machines, Bayesian networks, and genetic algorithms. An AI may employ a training model or federated learning.

"Machine Learning" (ML) or more specifically machine learning processes as used herein refers to, but is not limited, to programs, algorithms or software tools, which allow a given device or program to learn to adapt its functionality based on information processed by it or by other independent processes. These learning processes are in practice, gathered from the result of said process which produce data and or algorithms that lend themselves to prediction. This prediction process allows ML-capable devices to behave according to guidelines initially established within its own programming but evolved as a result of the ML. A machine learning algorithm or machining learning process as employed by an AI may include, but not be limited to, supervised learning, unsupervised learning, cluster analysis, reinforcement learning, feature learning, sparse dictionary learning, anomaly detection, association rule learning, inductive logic programming.

A "barcode" as used herein may refer to, but is not limited to, a method of representing data in a visual, machine-readable form. A barcode may represent data by varying the widths and spacings of parallel lines such as within linear or one-dimensional (1D) or using rectangles, dots, hexagons, and other geometric patterns, called matrix codes or two-dimensional (2D) barcodes. A barcode may comply with a standard or be application specific in order to represent the encoded alphanumeric data.

Now referring to FIG. 1 there is depicted a schematic 100 of a network to which an Electronic Device 101 supporting Remote Access System (RAS) Systems, Applications and Platforms (SAPs) and RAS-SAP features according to embodiments of the invention is connected. Electronic Device 101 may, for example, be a PED, a FED, or a wearable device and may include additional elements above and beyond those described and depicted. Also depicted in conjunction with the Electronic Device 101 are exemplary internal and/or external elements forming part of a simplified functional diagram of an Electronic Device 101 within an overall simplified schematic of a system supporting SAP features according to embodiments of the invention which include includes an Access Point (AP) 106, such as a Wi-Fi AP for example, a Network Device 107, such as a communication server, streaming media server, and a router. The Network Device 107 may be coupled to the AP 106 via any combination of networks, wired, wireless and/or optical communication links. Also connected to the Network 102 are Social Media Networks (SOCNETS) 165; first and second remote systems 170A and 170B respectively; first and second websites 175A and 175B respectively; first and third 3rd party service providers 175C and 175E respectively; and first to third servers 190A to 190C respectively.

The Electronic device 101 includes one or more Processors 110 and a Memory 112 coupled to Processor(s) 110. AP 106 also includes one or more Processors 111 and a Memory 113 coupled to Processor(s) 210. A non-exhaustive list of examples for any of Processors 110 and 111 includes a central processing unit (CPU), a digital signal processor (DSP), a reduced instruction set computer (RISC), a complex instruction set computer (CISC), a graphics processing unit (GPU) and the like. Furthermore, any of Processors 110 and 111 may be part of application specific integrated circuits (ASICs) or may be a part of application specific standard products (ASSPs). A non-exhaustive list of examples for Memories 112 and 113 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic Device 101 may include an audio input element 214, for example a microphone, and an Audio Output Element 116, for example, a speaker, coupled to any of Processor(s) 110. Electronic Device 101 may include an Optical Input Element 218, for example, a video camera or camera, and an Optical Output Element 220, for example an LCD display, coupled to any of Processor(s) 110. Electronic Device 101 also includes a Keyboard 115 and Touchpad 117 which may for example be a physical keyboard and touchpad allowing the user to enter content or select functions within one of more Applications 122. Alternatively, the Keyboard 115 and Touchpad 117 may be predetermined regions of a touch sensitive element forming part of the display within the Electronic Device 101. The one or more Applications 122 that are typically stored in Memory 112 and are executable by any combination of Processor(s) 110. Electronic Device 101 also includes Accelerometer 160 providing three-dimensional motion input to the Processor (s) 110 and GPS 162 which provides geographical location information to Processor(s) 110. as described and depicted below in respect of FIGS. 2 and 3 respectively an Application 122 may support communications with a remote access system allowing one or more remote sessions to be established each associated with one or more Virtual Machines (VMs) allowing non-native applications (e.g. those requiring an Operating System (OS) different to that in execution upon the Processor 110) to be accessed and executed.

Electronic Device 101 includes a Protocol Stack 124 and AP 106 includes an AP Stack 125. Within Protocol Stack 124 is shown an IEEE 802.11 protocol stack but alternatively may exploit other protocol stacks such as an Internet Engineering Task Force (IETF) multimedia protocol stack for example or another protocol stack. Likewise, AP Stack 125 exploits a protocol stack but is not expanded for clarity. Elements of Protocol Stack 124 and AP Stack 125 may be implemented in any combination of software, firmware and/or hardware. Protocol Stack 124 includes an IEEE 802.11-compatible PHY module that is coupled to one or more Tx/Rx & Antenna Circuits 128A and an IEEE 802.11-compatible MAC module which is coupled to an IEEE 802.2-compatible LLC module. Protocol Stack 124 also includes modules for Network Layer IP, a transport layer User Datagram Protocol (UDP), a transport layer Transmission Control Protocol (TCP), a session layer Real Time Transport Protocol (RTP), a Session Announcement Protocol (SAP), a Session Initiation Protocol (SIP) and a Real Time Streaming Protocol (RTSP). Protocol Stack 124 includes a presentation layer Call Control and Media Negotiation module 150, one or more audio codecs and one or more video codecs. Applications 122 may be able to create maintain and/or terminate communication sessions with the Network Device 107 by way of AP 106 and therein via the Network 102 to one or more of Social Networks (SOC-NETS) 165; first and second remote systems 170A and 170B respectively; first and second websites 175A and 175B respectively; first and third 3rd party service providers 175C and 175E respectively; and first to third servers 190A to 190C respectively. As described below in respect of FIGS. 2 and 3 a Remote Access System may be executed by and/or accessed by the Electronic Device 101 via the Network 102 on one or more of first and second websites 175A and 175B respectively; first and third 3rd party service providers 175C and 175E respectively; and first to third servers 190A to 190C respectively.

Typically, Applications 122 may activate any of the SAP, SIP, RTSP, and Call Control & Media Negotiation 150 modules for that purpose. Typically, information may propagate from the SAP, SIP, RTSP, Call Control & Media Negotiation 150 to the PHY module via the TCP module, IP module, LLC module and MAC module. It would be apparent to one skilled in the art that elements of the Electronic Device 101 may also be implemented within the AP 106 including but not limited to one or more elements of the Protocol Stack 124, including for example an IEEE 802.11-compatible PHY module, an IEEE 802.11-compatible MAC module, and an IEEE 802.2-compatible LLC module. The AP 106 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, and a call control & media negotiation module. Portable electronic devices (PEDs) and fixed electronic devices (FEDs) represented by Electronic Device 101 may include one or more additional wireless or wired interfaces in addition to or in replacement of the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1010, DSL, Dial-Up, DOCSIS, Ethernet, G.hn, ISDN, MoCA, PON, and Power line communication (PLC).

The Front End Tx/Rx & Antenna 128A wirelessly connects the Electronic Device 101 with the Antenna 128B on Access Point 206, wherein the Electronic Device 101 may support, for example, a national wireless standard such as GSM together with one or more local and/or personal area wireless protocols such as IEEE 802.11 a/b/g Wi-Fi, IEEE 802.16 WiMAX, and IEEE 802.15 Bluetooth for example. Accordingly, it would be evident to one skilled the art that the Electronic Device 101 may accordingly download original software and/or revisions for a variety of functions. In some embodiments of the invention the functions may not be implemented within the original as sold Electronic Device 101 and are only activated through a software/firmware revision and/or upgrade either discretely or in combination with a subscription or subscription upgrade for example. Accordingly, as will become evident in respect of the description below the Electronic Device 101 may provide a user with access to one or more RAS-SAPs including, but not limited to, software installed upon the Electronic Device 101 or software installed upon one or more remote systems such as those associated with Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively for example.

Accordingly, within the following description a remote system/server may form part or all of the Social Networks (SOCNETS) 165; first and second remote systems 170A and 170B respectively; first and second websites 175A and 175B respectively; first and third 3rd party service providers 175C and 175E respectively; and first to third servers 190A to 190C respectively. Within the following description a local client device may be Electronic Device 101 such as a PED, FED or Wearable Device and may be associated with one or more of the Social Networks (SOCNETS) 165; first and second remote systems 170A and 170B respectively; first and second websites 175A and 175B respectively; first and third 3rd party service providers 175C and 175E respectively; and first to third servers 190A to 190C respectively. Similarly, a storage system/server within the following descriptions may form part of or be associated within Social Networks (SOCNETS) 165; first and second remote systems 170A and 170B respectively; first and second websites 175A and 175B respectively; first and third 3rd party service providers 175C and 175E respectively; and first to third servers 190A to 190C respectively.

Figure 2:
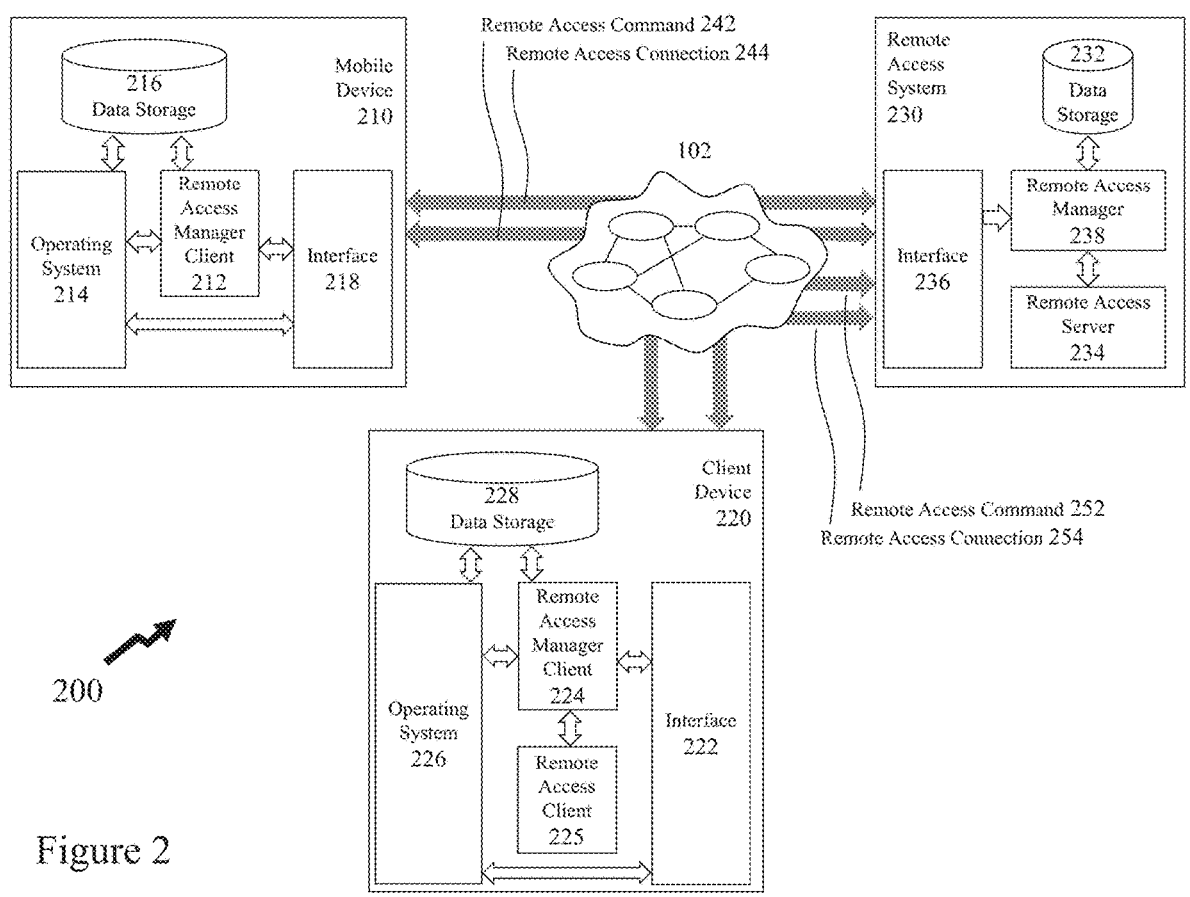
FIG. 2 depicts an exemplary block diagram of a system for initiating or transferring a remote access session between a mobile client and/or a client device and a remote access system supporting embodiments of the invention.

Now referring to FIG. 2 there is depicted a schematic diagram 200 depicting an exemplary configuration for initiating a remote access session for connecting a Mobile Device 210 to a Remote Access System 206 and/or a Client Device 220. As depicted the Mobile Device 210 is in communication with the Remote Access System 230 over a Network 102, such as a local area network (LAN), wide area network (WAN), or the Internet. Further, the Client Device 220 is in communication with the Remote Access System 230 over the Network 102. Optionally, the remote sessions of the Mobile Device 210 and the Client Device 220 are independent sessions. Optionally, within the Remote Access System 230 may transfer a session to the Client Device 220 when the Mobile Device 210 is in proximity to the Client Device 220 where the transferred session is either configured upon an existing established session or is established by the Client Device 220 in dependence upon a communication or communications from the Remote Access System 230. Optionally, the Remote Access System 230 may transfer a session to the Mobile Device 210 from the Client Device 220 when the Mobile Device 210 is initially in proximity to the Client Device 220 and then is moved out of proximity whilst the remote session is still active, where the transferred session is either configured upon an existing established session or is established by the Mobile Device 210 in dependence upon a communication or communications from the Remote Access System 230. The Mobile Device 210 and Client Device 220 may be associated with a common user or with different users. Optionally, the Remote Access System 230 may also host and/or initiate a remote access session at a predetermined time.

The Remote Access System 230 may include one or more computing devices that perform the operations of the Remote Access System 230 and may, for example be a server such as first to third Servers 190A to 190C respectively individually or in combination. It would be evident that the Mobile Device 210 may be a PED, FED, or Wearable Device. Accordingly, with a session involving only the Mobile Device 210 and the Remote Access System 230 the session is established, maintained and terminated in dependence upon one or more Remote Access Commands 242 over a Remote Access Connection 244 between the Mobile Device 210 and the Remote Access System 230. Accordingly, with a session involving only the Client Device 220 and the Remote Access System 230 the session is established, maintained and terminated in dependence upon one or more Remote Access Commands 224 over a Remote Access Connection 254 between the Client Device 220 and the Remote Access System 230. When the session involves both the Mobile Device 210 and the Client Device 220 with the Remote Access Server then the session is established, maintained and terminated in dependence upon one or more Remote Access Commands 242 over a Remote Access Connection 244 between the Mobile Device 210 and the Remote Access System 230 and one or more Remote Access Commands 224 over a Remote Access Connection 254 between the Client Device 220 and the Remote Access System 230.

In each scenario one or more remote access sessions are established at the Remote Access System 230, either upon or in associated with a server such as first to third Servers 190A to 190C respectively in FIG. 1. The server, e.g. first Server 190A, may include one or more computing devices that perform the operations of the server. The server may be included in the Remote Access System 230 or another system that is separate and/or distinct from the Remote Access System 230 or the Remote Access System 230 may be in execution upon the server. A server application at the server initiates the one or more remote access sessions where initiating a remote access session may include, for example, executing boot-up and/or logon processes, such as running a script that automatically executes when the user logs in to the session, running applications from a folder designated as including applications to be automatically executed when the user logs in to the session, running services that automatically execute when the session starts and/or the user logs in to the session, and/or executing group policies or group policy preferences when the user logs in to the session. Alternatively, the remote access session may start the session and/or log in the user but only execute applications when these are triggered by one or more actions of the user upon the Mobile Device 210 and/or Client Device 220. In some implementations, the server application initiates the remote access session in response to determining that a remote access session has not already been initiated when a request from a device, e.g. Mobile Device 210 and/or Client Device 220, is received.

Figure 3A:
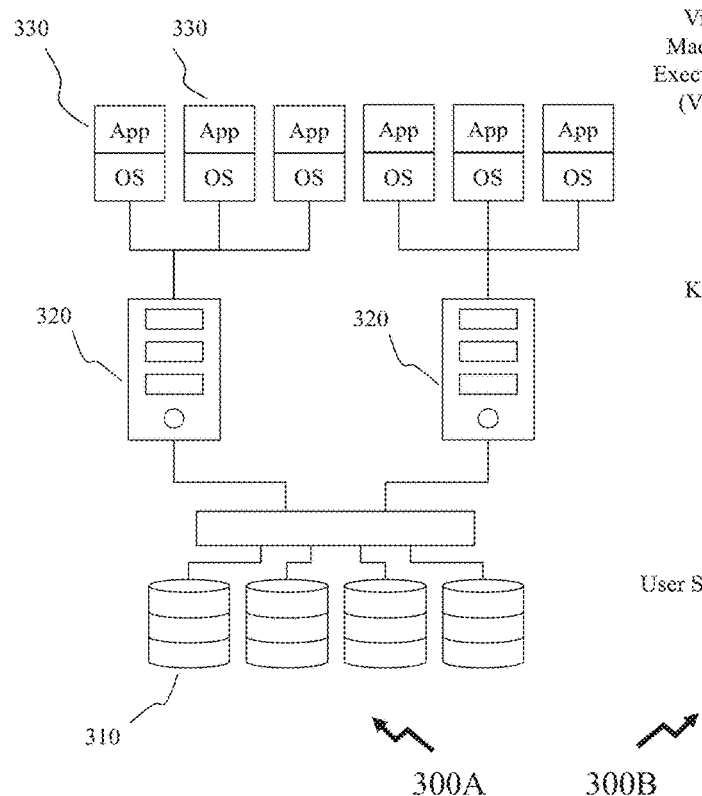
FIG. 3A depicts schematically an architecture of virtual machines as instantiated by remote access sessions supporting embodiments of the invention.
Figure 3B:
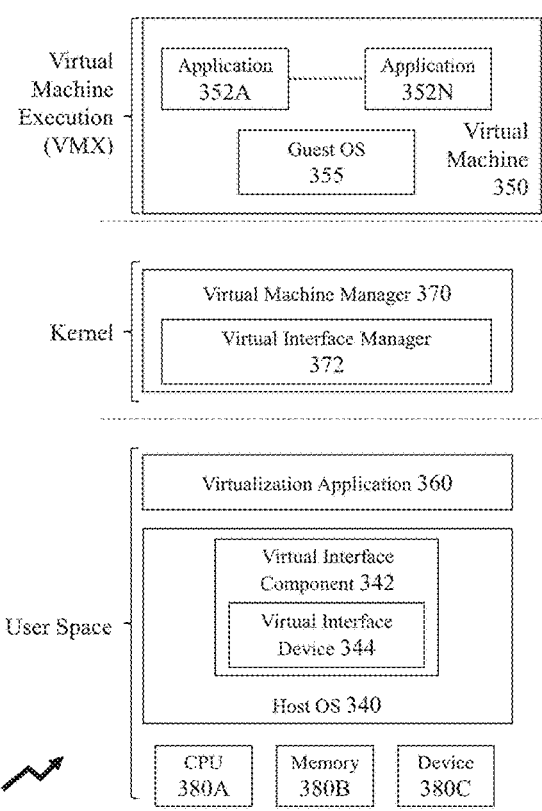
FIG. 3B depicts a high-level diagram of a computer system supporting exemplary virtual machine execution environments supporting one or more aspects and/or embodiments of the invention.

A remote access session may for example be an instance of a Virtual Machines 330 and 350 as described and depicted in FIGS. 3A and 3B respectively, is an instance of a user session or profile in execution upon the Remote Access System 230 which is accessed remotely at the Mobile Device 210 and/or Client Device 220 by a client application in execution upon the respective Mobile Device 210 and/or Client Device 220. The Mobile Device 210 and/or Client Device 220 connects to the Remote Access System 230 and initiates either a new remote access session or accesses an established remote access session either in execution or suspended pending user re-initiation. The remote access session allows the Mobile Device 210 and/or Client Device 220 to access resources of the Remote Access System 230 and therein those of the server(s) forming part of server or server system associated with the Remote Access System 230, such as volatile memory (e.g., random access memory), persistent memory (e.g., a hard drive), a processor (e.g., a central processing unit (CPU) or a graphics processing unit (GPU)), a component or components of an operating system, or an application or applications such as Applications 352A to 352N respectively as depicted in FIG. 3B. One or more of these resources may be physical resources that are accessed through the remote access session (e.g., through a terminal service) and are either directly accessible to the Remote Access System 230 or accessible to the Remote Access System 230 via the Network 102 or another network to which the Remote Access System 230 is also connected. For example, the Remote Access System 230 may be in execution upon a server which forms part of a server farm wherein the Remote Access System 230 can access resources upon or associated with the other servers in the server farm. One or more of these resources may be virtual resources that accessed through the remote access session (e.g., through remote desktop virtualization via a Virtual Machine). Optionally, the Remote Access System 230 may cause the Mobile Device 210 and/or Client Device 220 to connect to the remote access session, such that a user of the Mobile Device 210 and/or Client Device 220 may then use the remote access session to access the resources and/or applications of the server. Optionally, the user of the Mobile Device 210 and/or Client Device 220 may trigger the connection to the Remote Access System 230 to establish the remote access session so that the user of the Mobile Device 210 and/or Client Device 220 may then use the remote access session to access the resources and/or applications of the server.

Within embodiments of the invention the Mobile Device 210 and/or Client Device 220 may communicate with the Network 102 through a wireless connection, such as a terrestrial wireless communication system (e.g., a cellular data network or one or more Wi-Fi networks) or a satellite system for example. Alternatively, the Mobile Device 210 and/or Client Device 220 may communicate with the Network 102 through a wired connection, such as Ethernet or Internet over cable for example. Alternatively, the Mobile Device 210 and/or Client Device 220 may communicate with the Network 102 through a wireless connection such as depicted in FIG. 1 to a network access point (e.g. Access Point 106) and therein to the Network 102 via Network Device 107 or through a network access point directly to the Network 102.

A remote access session may be possible only within a predetermined geofence, e.g. a Mobile Device 210 associated with user of an enterprise can only successfully establish a remote access session if the Mobile Device 210 is within one or more geofences where each geofence is associated with a location of the enterprise and/or a residence of the user, for example. Similarly, Client Device 206 may be similarly geofenced such that movement of the Client Device 206 inside a geofence allows a remote access session to be established and movement of the Client Device 206 outside of the geofence prevents a remote session being established and/or terminates an existing remote session. The application(s) accessible to the user within a remote access session are determined by whether the Mobile Device 210 and/or Client Device 220 used by the user is within a geofence. A user may define the geofences themselves, e.g. their residence or set it to some default inaccessible geofence (e.g. one of zero radius or the North Pole for example) such that upon loss of the Mobile Device 210 and/or Client Device 220 access to application(s) and/or remote access sessions is prevented. The Mobile Device 210 and/or Client Device 220 may determine their location by one or more means including, but not limited to, accessing a global positioning system (GPS, such as GPS receiver 162 as depicted in FIG. 1), by triangulation with or proximity to signals from one or more antennas with known locations, such as cellular data network towers in a cellular data network or Wi-Fi devices in the Wi-Fi networks. Optionally, the Mobile Device 210 and/or Client Device 220 may establish its location by communicating with another device in its proximity, e.g. a Mobile Device 210 without a GPS may establish a personal area network connection to another device, e.g. a smartphone of the user, and therein obtain its location.

As depicted in FIG. 2 the Mobile Device 210 includes one or more Interfaces 218 to communicate with the Network 102, such as wireless interfaces to a cellular data network, a Wi-Fi network, and/or a satellite system, for example, or a wired interface to an Internet Router, for example. The Mobile Device 210 includes a Remote Access Manager Client 212 that communicates with an Operating System 214 of the Mobile Device 210, for example, to determine a location of the Mobile Device 210 or access one or more applications. an application in execution upon the Mobile Device 210 may trigger the Remote Access Manager Client 212 to access the Remote Access System 230. The Remote Access Manager Client 212 and Operating System 214 can each access Data Storage 216.

Similarly, as depicted in FIG. 2 the Client Device 220 includes one or more Interfaces 222 to communicate with the Network 102, such as wireless interfaces to a cellular data network, a Wi-Fi network, and/or a satellite system, for example, or a wired interface to an Internet Router, for example. The Client Device 220 includes a Remote Access Manager Client 224 that communicates with an Operating System 226 of the Client Device 220, for example, to determine a location of the Client Device 220 or access one or more applications. an application in execution upon the Client Device 220 may trigger the Remote Access Manager Client 224 to access the Remote Access System 230. The Remote Access Manager Client 224 and Operating System 226 can each access Data Storage 216 whilst the Remote Access Manager Client 224 may also access or communicate with Remote Access Client 225.

Similarly, as depicted in FIG. 2 the Remote Access System 230 includes one or more Interfaces 236 to communicate with the Network 102 and a Remote Access Manager 238 which communicates with Data Storage 232 that stores information that identifies or relates to a remote access session associated with the Mobile Device 210 and/or Client Device 220. As depicted the Remote Access Manager 238 communicates via Remote Access Commands 242 over Remote Access Connection 244 between its Interface 236 and Interface 236 of the Mobile Device 210. Similarly, the Remote Access Manager 238 communicates via Remote Access Commands 224 over Remote Access Connection 254 between its Interface 236 and Interface 222 of the Client Device 220. Accordingly, the Mobile Device 210 and/or Client Device 220 can send a remote access command to the Remote Access System 230 to initiate and/or connect to a remote access session or the Remote Access System can send a remote access command to Mobile Device 210 and/or Client Device 220 to initiate and/or connect to a remote access session.

As depicted in FIG. 2 the Remote Access System 230 in addition to the Remote Access Manager 238 and Data Storage 232 includes a Remote Access Server 234 which is hosted at a server that may include one or more computing devices. The server may be included in the Remote Access System 230 or be a system that is separate and/or distinct from the Remote Access System 230. The Remote Access Manager 238 may cause the Remote Access Server 234 to initiate a remote access session. Once connected, a user of the Mobile Device 210 may access resources provided by the server through the Remote Access Connection 244 to the remote access session or a user of the Client Device 220 may access resources provided by the server through the Remote Access Connection 254 to the remote access session.

Within some implementations, the Remote Access Manager Client 212 at the Mobile Device 210 and/or the Remote Access Manager Client 224 at the Client Device 220 receive an input from a user, device, and/or application that includes authentication information, such as a user name, password, and/or one-time password. The Remote Access Manager Client 212 and/or the Remote Access Manager Client 224 may provide the authentication information to the Remote Access Manager 238. The Remote Access Manager 238 may condition the sending of the Remote Access Command 242 on having successfully verified authentication information received from the Mobile Device 210 or Remote Access Command 252 on having successfully verified authentication information received from the Client Device 220. This verification, being for example, against corresponding authentication information that is stored at the Remote Access System 230 in the Data Storage 232 or another memory accessible to the Remote Access System 230 (e.g., a username and/or password) and/or calculated by the Remote Access Manager 238 (e.g., a one-time password). In some implementations, the authentication information may include information from a scanner/device, such as biometric data from a biometric scanner and/or biometric device (e.g. a fingerprint, facial scanner, or credential data of the user from a card scanner and/or reader device (e.g. as employed for access control), associated with the Mobile Device 210 and/or Client Device 220 or a location such as a worksite, office, enterprise access point etc. The information provided to the Remote Access System 230 by the Mobile Device 210 and/or Client Device 220 retrieved from the scanner/device may also include information that identifies a user account associated with the successful verification of the user or is retrieved from another system in dependence upon the information retrieved from the scanner/device. This information may be provided as obtained or as processed by a system such as the user's electronic device, e.g. Mobile Device 210 or Client Device 220. This information provided to the Remote Access System 230 may also include information that identifies the scanner/device as well as time and/or date of the information being acquired and/or geographic location information of the scanner/device location, Such a verification providing an alternate means of restricting remote access sessions and/or application executable within a remote access session to geofencing.

In response to successfully verifying the received authentication information, the Remote Access Manager 238 may perform a transformation on the received authentication information and/or additional information, such as by creating a hash of the information, to generate a key. The Remote Access Manager 238 may provide the key to the Remote Access Manager Client 212 at the Mobile Device 210 and/or the Remote Access Manager Client 224 at the Client Device 220. The Remote Access Manager Client 212 may store the key in a Data Storage 216 at the Mobile Device 210. The Remote Access Manager Client 224 may store the key in a Data Storage 228 at the Client Device 220. Alternatively, the Remote Access Manager Client 212 and/or the Remote Access Manager Client 224 may perform a transformation on the authentication information and/or additional information to generate the key and store the key in the Data Storage 216 and/or the Data Storage 228, respectively. The Remote Access Manager Client 212 may provide the key and/or a reverse of the transformation of the key to the Remote Access System 230 for authentication of the Mobile Device 210 by the Remote Access System 230. The Remote Access Manager Client 224 may provide the key and/or a reverse of the transformation of the key to the Remote Access System 230 with subsequent checks for remote access commands for authentication of the Client Device 220 by the Remote Access System 230. The communications between the Mobile Device 210, the Remote Access System 230, and/or the Client Device 220 over the Network 102 may be encrypted.

The authentication information used for authenticating the Remote Access Manager Client 224 at the Client Device 220 with the Remote Access Manager 238 at the Remote Access System 230 may be the same authentication information that is used to authenticate the Remote Access Client 225 with the Remote Access Server 234 or alternatively it may be separate and/or distinct.

In response to the Remote Access Manager Client 224 receiving the Remote Access Command 254, the Remote Access Manager Client 224 may instruct the Remote Access Client 225 to connect to the remote access session provided by the Remote Access Server 234 in the background of a user profile for the Client Device 220. Optionally, a user interface of the Client Device 220 may be locked requiring the user to provide authentication information to the Client Device 220 to unlock the user interface for the user profile where the Remote Access Client 225 establishes the Remote Access Connection 244 to the remote access session. Similarly, Remote Access Manager Client 212 receiving the Remote Access Command 242, the Remote Access Manager Client 212 may connect to the remote access session provided by the Remote Access Server 234 in the background of a user profile for the Mobile Device 210. Optionally, a user interface of the Mobile Device 210 may be locked requiring the user to provide authentication information to the Mobile Device 210 to unlock the user interface for the user profile where the Remote Access Manager Client 212 establishes the Remote Access Connection 254 to the remote access session.

The Remote Access Manager 238 may send a command to the Remote Access Server 234 to disconnect from a remote access session, for example, once the Remote Access Manager 238 has verified that the Remote Access Server 234 has completed a remote access session or upon receiving a Remote Access Command 242 from Mobile Device 210 or Remote Access Command 254 from Client Device 220 to terminate a remote access session. the Remote Access Manager 238 and/or Remote Access Server 234 may receive a Remote Access Command 242 from Mobile Device 210 or Remote Access Command 254 from Client Device 220 to log-off a remote access session such that the associated Remote Access Connection 244 or 232 is terminated but the processing upon the Remote Access System 230 and/or Remote Access Server 234 is not terminated. Accordingly, a remote access session may be initiated to establish a process, e.g. a numerical simulation within a computer aided design application, where the connection is not required to be maintained until the user wishes to access the results of the process. Similarly, the Remote Access Manager 238 and/or Remote Access Server 234 may receive a Remote Access Command 242 from Mobile Device 210 or Remote Access Command 254 from Client Device 220 to suspend a remote access session such that the associated Remote Access Connection 244 or 232 is terminated and the processing upon the Remote Access System 230 and/or Remote Access Server 234 suspended pending subsequent re-initiation of the remote access session.

Referring to FIG. 3A there is depicted a schematic architecture 300A supporting embodiments of the invention. As depicted a plurality of virtual machines (VMs) 330 are associated with a plurality of Computer Systems 320 which are themselves associated with Storage 310. The plurality of Computer Systems 320 may be directly connected or indirectly connected via one or more communications networks to the 310, such as Network 102 in FIGS. 1 and 2. Accordingly, each VM 130 may employ virtual memory pages which are mapped to physical memory pages upon the Storage 310. A Computer System 320 may be connected to one or more SANs 110. Whilst the descriptions in respect of FIGS. 3A to 3B are described with respect to a Computer System 320 hosting one or more VMs 330 it would be evident that these may be supported by a PED, a FED, a WED, a server or a WES directly or indirectly through communications within one of the plurality of Computer Systems 320. A computer system 320 may itself be a PED, a FED, a WED, a server, or a WES. Accordingly, a computer system 320 may, as depicted in FIG. 3B, support a virtual machine execution (VMX) environment as a host system directly or indirectly or it may include a virtual machine monitor (VMM) facilitating execution of one or more VMs, each of which may, as depicted in FIG. 3B, run a guest operating system (OS) 355 to manage one or more Guest Applications 352A to 352N respectively. Accordingly, a Computer System 320 may be a Remote Access System 230 and Storage 310 may be Data Storage 232 as depicted in FIG. 2. In this manner, a remote session established by a user may support one or more VMs 330 and therein a guess OS 355 and one or more Guest Applications 352A to 352N as depicted in FIG. 3B.

FIG. 3B depicts a high-level diagram of a computer system (host system) 300B supporting exemplary VMX environments supporting one or more aspects and/or embodiments of the present disclosure. The Host System 300B, e.g. Computer System 320 in FIG. 3A or Remote Access System 230 in FIG. 2, may include one or more central processing units (CPU) 380A communicatively coupled to one or more memory devices 380B and one or more peripheral devices 380C via a system bus, not depicted for clarity. The Host System 300B may implement a virtual execution environment for executing the software developed for a platform that is different from the native platform of the Host System 300B. In certain implementations, the virtual execution environment may be implemented using certain hardware-assisted virtualization features of the CPU 180A, which may support executing, at an elevated privilege level one or more elements, including but not limited to, a VMM 370 that manages one or more VMs. In various implementations, the VMM 370 may be implemented as a kernel module, a kernel extension, a driver, or a part of the Host Operating System (OS) 340. The Host OS 340 may further include a virtual interface component 142 which virtualizes a virtual interface component 142 to manage one or more Virtual Interface Devices 344 for use by the VM 350 and/or Host OS 340.

The VMM 370 may present a VM 350 with an abstraction of one or more virtual processors, while retaining selective control of processor resources, physical memory, interrupt management, and input/output (I/O). The VMM 370 may also present a VM 350 with an abstraction of one or more Virtual Interface Devices 344 of the Virtual Interface Component 342. A VM 350 may implement a software environment which may be represented by a stack including a Guest OS 355 and one or more applications 155A-155N. Each VM 350 may operate independently of other VMs and use the VMM-facilitated interface to the processors, memory, storage, graphics, and I/O provided by the Host System 300B. The VMM 370 may include a Virtual Interface Manager 372 to receive instructions to create a communication channel between a Host OS 340 and a Guest OS 355. The Virtual Interface Manager 372 may also send a request to Host OS 340 to create a Virtual Interface Device 344 and provide the Virtual Interface Device 144 to Guest OS 355. In considering VMX operation then there are two kinds of VMX operation commonly referred to, namely VMX root operation and VMX non-root operation. In general, a VMM, such as VMM 370 in FIG. 3B, will run in VMX root operation and guest software, such as Guest OS 355 and Applications 352A to 352N will run in VMX non-root operation. Transitions between VMX root operation and VMX non-root operation are called VMX transitions. There are two kinds of VMX transitions, those into VMX non-root operation from VMX operation are called VM entries whilst those from VMX non-root operation to VMX root operation are called VM exits.

Accordingly, a user may, for example, remotely access from either their PED, e.g. Mobile Device 210 in FIG. 2, and/or FED, e.g. Client Device 220 in FIG. 2, applications upon a remote system, e.g. Remote Access System 230 in FIG. 2, wherein a remote session they establish instantiates one or more instances of a Virtual Machine, such as Virtual Machine (VM) 350 in FIG. 3, to execute the application(s)

the user wishes to execute. By virtue of exploiting VMs 350 then the operating system for these applications may be different from or the same as that of the operating system of the user's electronic device. Accordingly, the VM 350 operating system, Guest OS 355, for each VM 350 instantiated may be established as one of Linux, Windows, Android, and iOS, for example, which may be the same as or different to the operating system of the user's device, e.g. Mobile Device 210 or Client Device 220.

Figure 4:
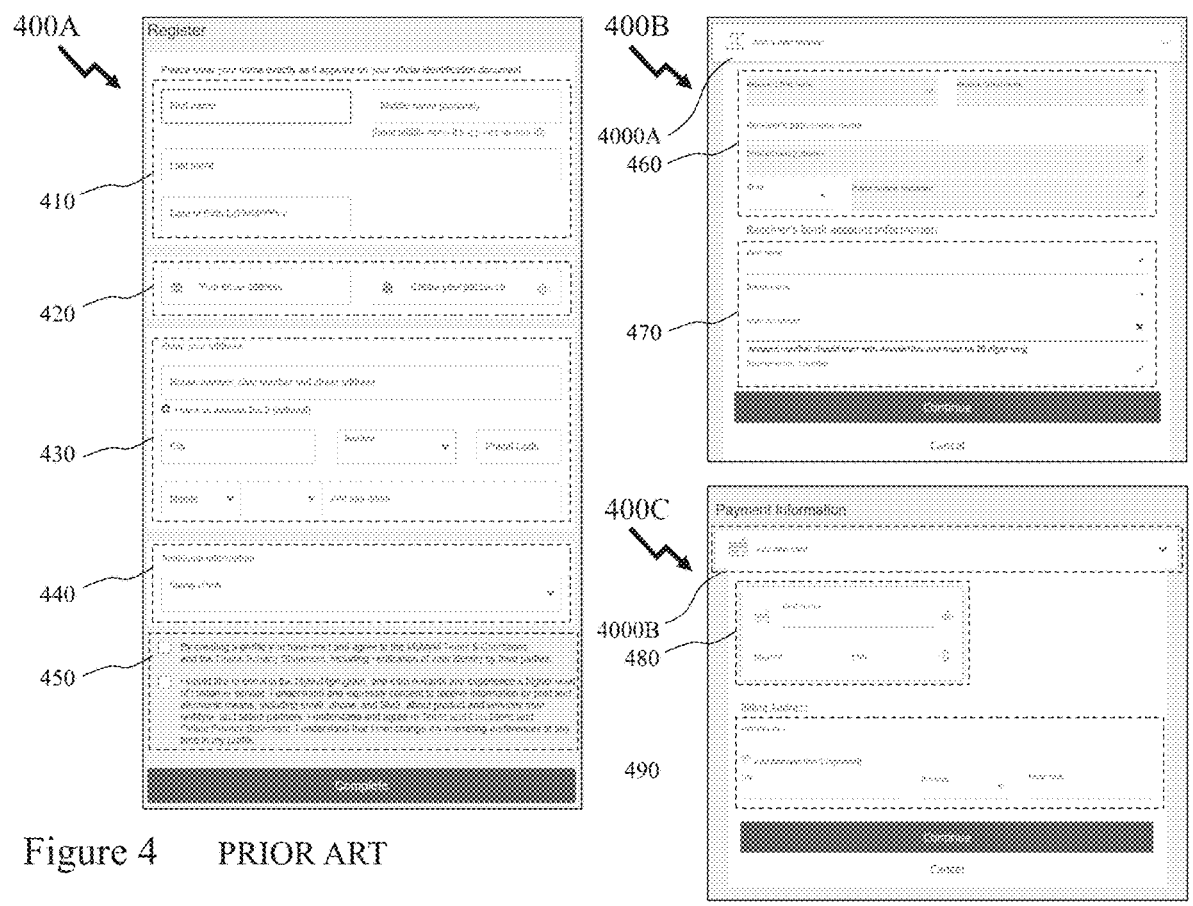
FIG. 4 depicts exemplary user interfaces for a software application providing a user with the ability to transfer electronic funds to another individual requiring the user to enter information.

FIG. 4 depicts exemplary graphical user interfaces (GUIs) for a software application (application) providing a user with the ability to transfer electronic funds to another individual requiring the user to enter information. Beneficially embodiments of the invention provide for an enhanced user experience as will become evident from the description below in respect of FIG. 4 and FIGS. 5-10 respectively. As depicted in FIG. 4 a user accessing a software application to transfer electronic funds to another user through a service provider is provided with a sequence comprising at least first to third GUIs 400A to 400C requiring the entry of user information. Considering, first GUI 400A then the user is presented with a registration screen for the entry of their personal information which would be subsequently accessed upon their logging into the software application with their credentials such as username and password. Accordingly, the user must complete each field within first to fifth blocks 410 to 450 respectively, wherein these are:

First block 410 comprising personal identification information of the registering user such as first name, middle name, last name, and date of birth;

Second block 420 comprising the registering user's electronic mail (email) address (which in the instance of this software application will become their username) and a password they wish to employ;

Third block 430 comprising further personal information relating to the registering use such as an address, and their mobile phone number;

Fourth block 440 comprising additional information, in this instance their country of birth; and Fifth block 450 comprising the registering user's acceptance of the service provider's (MyMyM) terms and conditions and/or the registering user's agreement to enter into a rewards program offered by MyMyM.

Upon agreement to the MyMyM terms and conditions and provisioning of the required information within first to fourth blocks 410 to 440 respectively the user is then presented with second GUI 400B. Accordingly, the user must complete each field within sixth and seventh blocks 460 and 470 respectively, wherein these are:

Sixth block 460 comprising personal identification information of the intended recipient such as name, address, and phone number; and Seventh block 470 comprising financial information relating to a bank account of the intended recipient.

Upon agreement to these blocks with the required information the user is then presented with third GUI 400C. Accordingly, the user must complete each field within eighth and ninth blocks 480 and 490 respectively, wherein these are:

Eighth block 480 comprising information relating to a credit card of the registering (or registered user) against which the financial transaction is to be charged; and Ninth block 490 wherein the address billing information of the credit card whose details were entered in eighth block 480 is provided.

Also evident in second and third GUIs 400B and 400C are first and second Store Information selectors 4000A and 4000B. If first and/or second Store Information selectors 4000A and 4000B are selected then the information entered by the user in sixth and seventh blocks 460 and 470 respectively and/or eighth and ninth blocks 480 and 490 respectively is stored by the service provider allowing the user to subsequently retrieve this information for a subsequent transaction. Such a storage of user entered text within defined fields and its storage to simplify subsequent use of the software application being well known within the prior art.

However, this does result in the storage of general and sensitive information, the latter being an issue for some individuals and/or organizations whose staff, employees etc. complete such registration forms. This being possible as the software application provided by the service provider has access to what information is requested and the information entered by the user. Accordingly, it would be beneficial to provide users and/or organizations with an ability to block the storage of sensitive information by a service provider or any remote application executed within a remote session.

Further, the information entered by the registering user is only accessible within the software application associated with the service provider. If the user now accesses another software application associated with a different service provider, for example, then they must enter all this information again. Accordingly, it would be beneficial to provide users and/or organizations with an ability to automatically populate fields within GUIs with information thereby removing an often tedious task for the user(s). Whilst the user can elect to not logout so that the software application is accessible this can result in security issues as any subsequent user of the same electronic device can access this software application in an already logged in state. Repeatedly entering the information though is tedious for the user although it does provide enhanced security of information.

Figure 5:
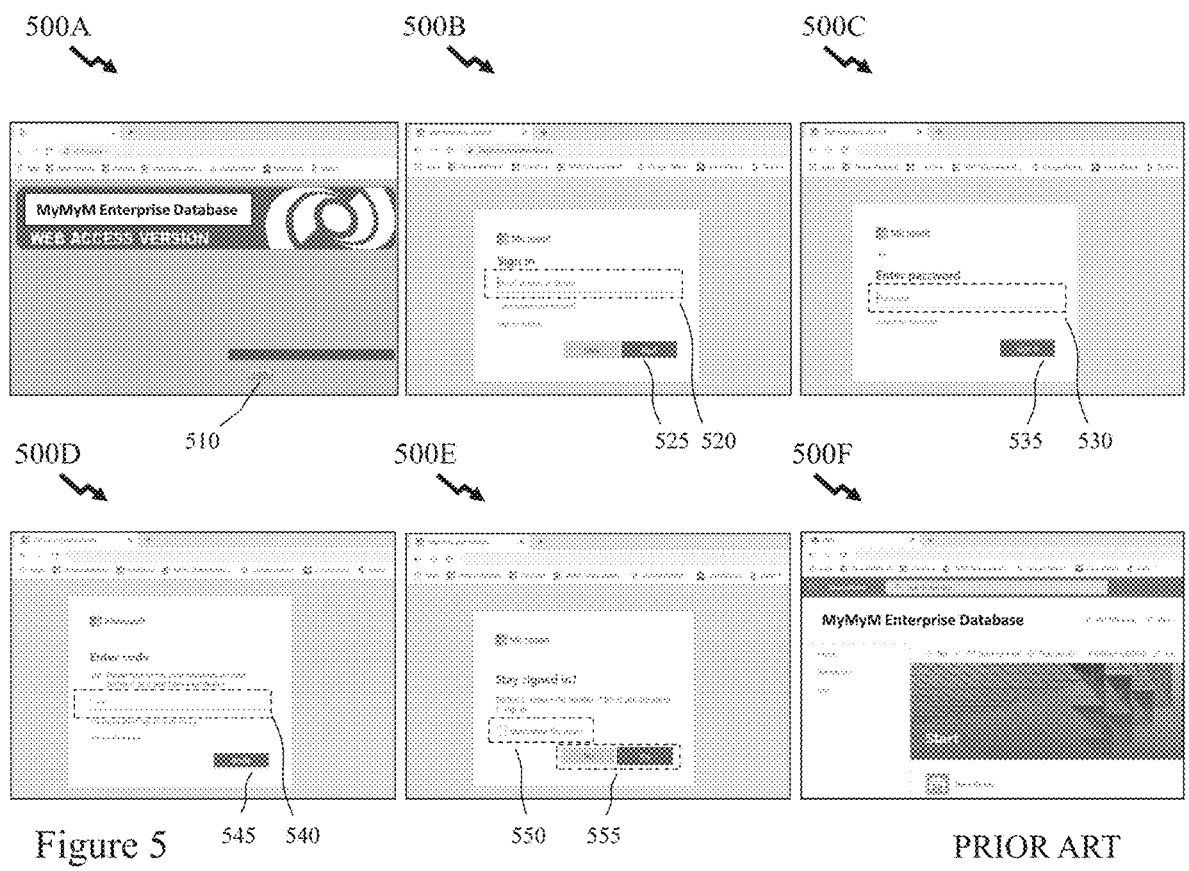
FIG. 5 depicts exemplary user interfaces for a software application providing a user with access to remote database requiring the user to provide credentials for verifying their identity.

An example of such a software application associated with an enterprise is depicted in FIG. 5 wherein exemplary first to sixth GUIs 500A to 500F. are depicted. These providing a user with access to remote database requiring the user to provide credentials for verifying their identity. Whilst this application may not require storage of personal information of the user and/or data relating to financial instruments (e.g. credit card, debit card data) and/or financial institutions (e.g. bank account data) the database contains confidential information with access restricted to those having an allowed user name and matching password to the user name. Again, within the prior art it is known for this information to be stored within a cookie or associate software object upon the user's local device so that it can be automatically retrieved. However, this again raises security concerns wherein an enterprise may perform an automatic deletion of such stored information to prevent security breaches or the user may lose this through a deletion from another process such as associated with cleaning and/or deleting a usage history. However, it would be evident that in the appropriate circumstances automatically populating these fields may be appropriate and accordingly the inventors have established embodiments of the invention to provide such an option.

Accordingly, as depicted in FIG. 5 the user is presented with:

First GUI 500A wherein the user has accessed a software application "MyMyM Enterprise Database" via remote session and is presented with option(s), in this case Login 510;

Second GUI 500B wherein if the user selects the GUI icon Login 510 they are provided with this screen allowing them to enter a username in first Field 520 which can be an email, phone number or identity with another software application (in this instance an instant messaging service Skype™) and then either return to first GUI 600A or proceed via selection of Next 525;

Third GUI 500C is presented to the user after selection of Next 525 in second GUI 500B wherein the user is prompted to enter a password in second Field 530 and therein sign in via the GUI icon Sign-In 535;

Fourth GUI 500D wherein the user have selected the Sign-In 535 GUI icon in third GUI 500C is prompted to enter a verification code in third Field 540 wherein as known in the prior art the verification code may be provided by a software application in execution upon another electronic device associated with the user, e.g. a PED, when the user is accessing the software application upon an electronic device, e.g. a FED, although the verification code may be acquired from another software application in execution upon the same electronic device as the software application. Once the user enters the verification code they can select the GUI icon Verify 545 wherein the software application verifies the verification code which may have been delivered to the user in parallel to the software application by the remote session or is automatically generated by the another software application;

Fifth GUI 500E is rendered to the user upon positive verification of the verification code and provides the user with the option to stay signed in such that if they close the software application their logged in status is maintained upon a subsequent access to the software application or to not stayed signed in such that closing the software application will log them out. The user selecting the appropriate option in GUI icon pair 555. The fifth GUI 500E also includes a tick box selector 550 where the user's selection of the tick box will prevent this fifth GUI 500E being rendered to the user although selecting this and selecting to stay logged in can lead to security issues as the user will be logged in and not have the option to change their prior selection; and Sixth GUI 500F wherein having worked through all or a defined subset of first to fifth GUIs 500A to 500E the user is now presented with a GUI allowing them to access the MyMyM Enterprise Database.

Accordingly, it is evident from FIGS. 4 and 5 that a user may be required to enter significant content in order to register with a software application, perform an activity with a software application or login to a software application. This is tedious, time consuming, and inconvenient to the user. Inconvenience can arise as secure credentials such as passwords etc. may be complex, difficult to remember, subject to entry error etc. For example, an enterprise may establish its own rules for a password such as, for example, it should be a minimum of 24 characters long and contain at least 2 numbers or that it is a password generated by the enterprise for the user which is 12 characters with letters, numbers and special characters without any association to a intelligible language, e.g. the code could be "Xy45k#vx1Rp?". These issues are further compounded where the software application is being remotely accessed by the user rather than upon their electronic device directly.

Accordingly, such a remotely accessed software application within a remote session upon a remote server may cause issues due to long network latency slowing the process or introducing typographical errors by the user etc. or though the actual text input itself being unsafe where text entered is lost. In order to lessen these issues the inventors have established embodiments of the invention as outlined below in FIGS. 6 to 12 wherein the text editing is transferred to the client's electronic device/application side and entered text is only transmitted to the remote session as a necessity. Within other embodiments of the invention previously entered text may be retrieved and employed to automatically complete fields within a software application but in contrast to prior art auto-fill which simply associates a field with text so that the same text is entered into a field with the same identifier the inventors require that the context of the previously entered text is stored so that this previously stored text can only be employed in automatically populating fields or making selections when the context of the current use matches the context of the original entry.

Accordingly, input fields within a software application may be established based upon processing of the GUI and/or content of the software application provided to an electronic device from a remote system within a remote session and these may be either automatically populated or populated in dependence upon user selections, e.g. a user tapping a field or fields or making a selection of a field or fields, with respect to the rendered GUI. Optionally, this automatic population or user defined population may require that the user enter no text locally but that the fields are populated at the remote system. Further as evident within the subsequent description these steps may be performed upon another electronic device associated with the user rather than the electronic device upon which the software application will be accessed and employed within the remote session.

It would be evident to one of skill in the art that such embodiments of the invention may be employed to further reduce inconvenience etc. to users with editing and/or filling in web forms etc. upon PEDs with increased mobility, such as smartphones, wearable devices etc., in mobile device sessions as well as with those based around FEDs and/or less mobile PEDs such as laptops which tend to be used in a fixed location rather than employed as the user walks, moves, etc. For example, whilst editing/filling in a web form within a mobile device session this remote session can abandon unexpectedly. Accordingly, embodiments of the invention allow for the re-established session to recognize that fields had been previously filled in and were either stored or temporarily stored during the editing/filling of the web form such that the re-established session is at point close to that when the session terminated such that the user does not have to complete entry of all the form content again. Further, as discussed with respect to embodiments of the invention the completed web form data can be employed within a mobile remote session to automatically populate some or all fields of the web form either for the same software application or another software application where mapping fields from one application to another is supported.

Embodiments of the invention may support remote software applications and/or remote sessions across multiple operating systems (e.g. iOS, Windows etc.) or they may be limited to a single operating system, to multiple browsers of one or more operating systems, a specific browser and operating system, or all browsers having a common base (e.g. those browsers exploiting Chromium for example).

Further, as will be evident from the embodiments of the invention described and depicted below a user may be advised as to whether they wish to recognize/save form fields or designate form fields as sensitive data not to be stored.

Further, as will be evident from the embodiments of the invention described and depicted below a user may be advised as to whether they wish to recognize/load data to all form fields or designate specific form fields to load data into.

Figure 6:
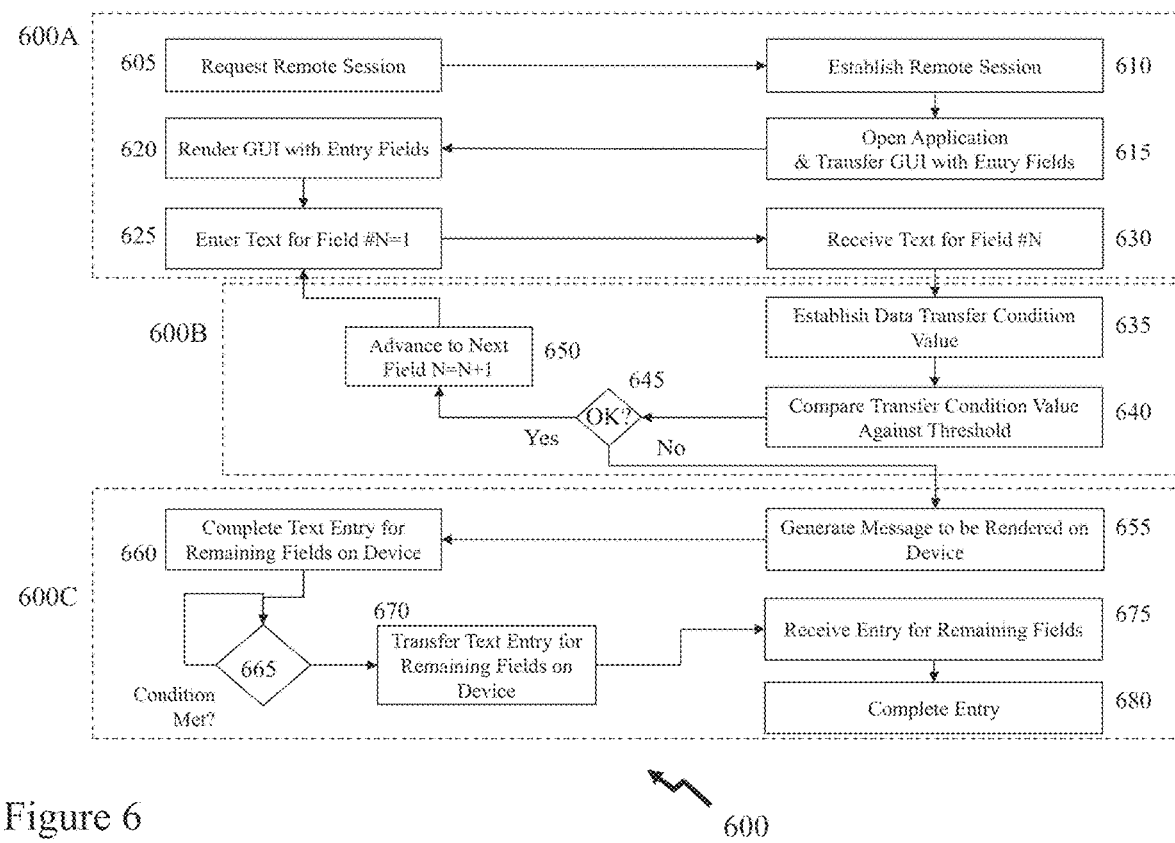
FIG. 6 depicts an exemplary process flow according to an embodiment of the invention.

Now referring to FIG. 6 depicts an exemplary Process Flow 600 according to an embodiment of the invention comprising first to sixteenth steps 605 to 680 respectively in first to third sub-flows 600A to 600C, respectively. Accordingly, referring to first sub-flow 600A this comprises first to sixth steps 605 to 630, wherein these comprise:

First step 605 wherein a user requests from their local device (e.g. the user's device), e.g. Local Device 210 or Client Device 220 as depicted in FIG. 2, a remote session upon a remote system, e.g. Remote Access System 230 as depicted in FIG. 2, wherein the request may include a specified application or this may established subsequent to the remote session through another sequence of steps not depicted for clarity;

Second step 610 wherein the remote session is established upon the remote system;

Third step 615 wherein the remote system opens the application and transfers data to the local device relating to a GUI with entry fields, i.e. fields requiring entry of data;

Fourth step 620 wherein the GUI with entry fields is rendered to the user;

Fifth step 625 wherein the user enters data for Field #N (initially N=1 but increments with loop from second sub-flow 600B); and Sixth step 630 wherein the user entered data is transferred to the remote system as text (either as a series of send blocks of data as the user enters each character or as a single block upon a predetermined timeout or action of the user).

Accordingly, the first field has been entered and the process proceeds to second sub-flow 600B to iterate for all remaining fields. Second sub-flow 600B comprises seventh to tenth steps 635 to 650 respectively, wherein these comprise:

Seventh step 635 where a data transfer condition value is established. The data transfer condition relating to communications between the local device and the remote system such as latency, a geofence etc.;

Eighth step 640 wherein a current value of the data transfer condition is compared to the data transfer condition value and this comparison employed in ninth step 645;

Ninth step 645 where the comparison determines either whether the data transfer condition meets the data transfer condition value (e.g. latency is less than the set latency threshold value, or the geolocation of the local device is within the geofence) or not and proceeds to tenth step 650 if the condition is met or eleventh step 655 if the condition is not met; and Tenth step 650 wherein the process advances to the next field.

Accordingly, if the condition is met each time the process loops then it sequentially acquires content for all of the fields within the transferred GUI. However, if the condition is not met then the process proceeds to eleventh step 655 in third sub-flow 600C which comprises eleventh to fifteenth steps 655 to 675 respectively, wherein these comprise:

Eleventh step 655 wherein a message is generated by the remote session for rendering on the local device, e.g. "You have left the designated geofence and text entry will be maintained locally but not for the session" if the geolocation of the local device is now not within the geofence triggering ninth step 645 in second sub-flow 600B to fail the condition test. This message is transferred to the local device and rendered to the user for a predetermined period of time. This message including the data transfer condition and data transfer condition value within some embodiments of the invention;

Twelfth step 660 wherein the user completes entry of the text into the remaining fields for the GUI upon their local device;

Thirteenth step 665 wherein subsequently it is determined by the local device discretely or by the local device in combination with the remote system that the data transfer condition has been met again wherein the process proceeds to step 670 if it has or loops around if not;

Fourteenth step 670 wherein the text entry for the remaining fields is transferred from the local device to the remote system in a discrete communication;

Fifteenth step 675 wherein the remote system receives the text entry for the remaining fields; and Sixteenth step 680 where the remote system completes the entry for the fields within the transferred GUI.

Accordingly, it would be evident that the Process Flow 600 may be applied to an individual GUI such as first to third GUIs 400A to 400C respectively in FIG. 4 or second to fifth GUIs 500B to 500E in FIG. 5 and that the process may repeat for each GUI associated with the software application in the remote session. Accordingly, another loop for these may be established within a variant of Process Flow 600 according to an embodiment of the invention.

Process Flow 600 therefore provides a user with a means to continue entering data within fields of a GUI when a data transfer condition is not met, e.g. network latency exceeds a predetermined threshold, or the user has moved outside of a geofence with their local device. It would be evident that as the user's local device is accessing a software application through a remote session that the software of the user's local device establishing and maintaining the remote session would be capable of continuing to allow text entry by the user when the message generated by the remote system in eleventh step 655 is received by the local device. This may be implemented, for example, through the provisioning of a browser plug-in that captures the GUI rendered and allows the user to indicate fields and enter text which is rendered and stored but not send to the remote system until the data transfer condition is met. It would be evident that this entered field text data may be stored encrypted wherein the decryption key is help by the remote system. Alternatively, a software application may be installed and in execution upon the local client to maintain the entry of text into the remaining fields.

Optionally, the message in eleventh step 655 may not be rendered to the user when received but upon completion of entry of all fields, e.g. "You have left the designated geofence and the entered text will be transferred when you are back within the designated geofence." Optionally, the message may not be rendered such as when the condition relates to network latency and whilst this exceeded the threshold triggering the completion of field entry upon the local device it is below the threshold when the user completes text entry into the other fields and the data is transferred. In this instance the user may not be aware that their entry was initially remote and subsequently local. Optionally, within another embodiment of the invention a condition threshold may be arbitrarily set to a value forcing the process onto the local device so that all text entry is on the local device suppressing communications during the text entry. In this manner, a single communication with data payload of the text entry may be sent from the local device to the remote system rather than a continuous series of communications between the local device and remote system reducing the potential for interception as it is now not evident to any monitoring that the message is text entered for fields of a GUI rather than any other content.

Figure 7:
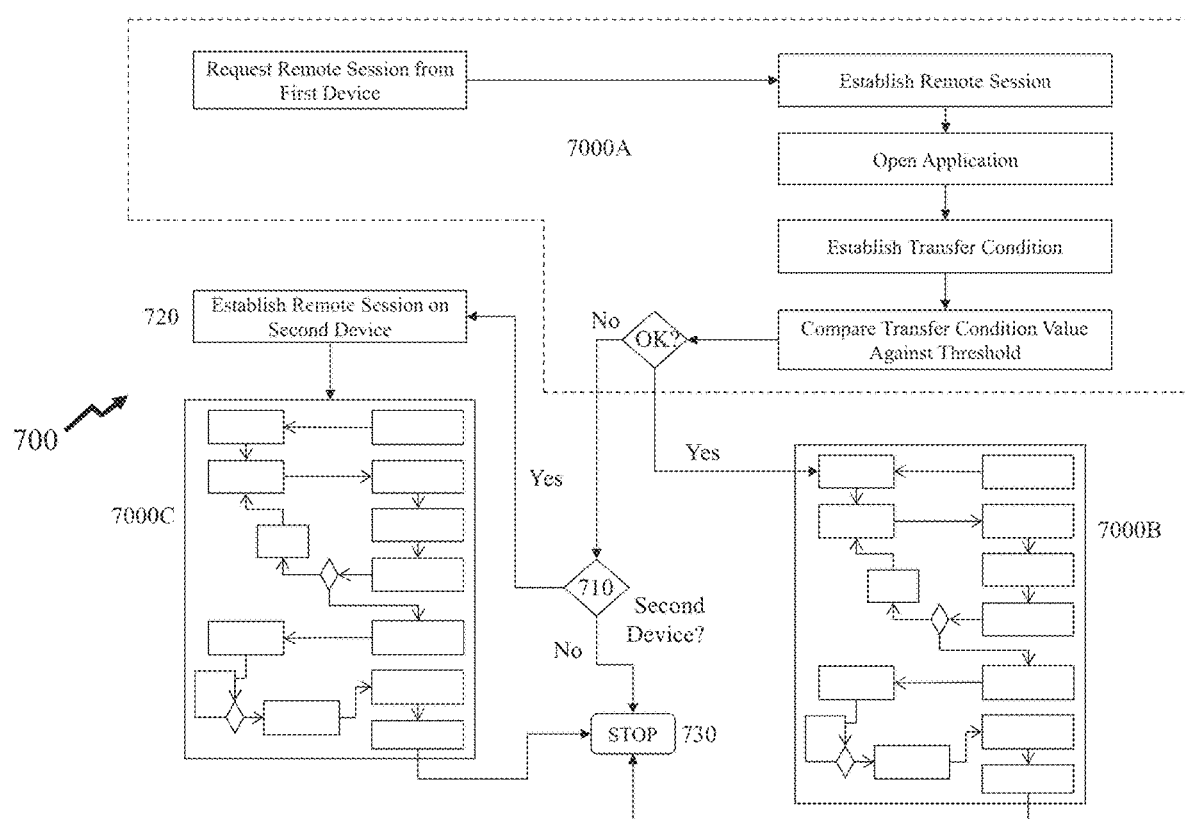
FIG. 7 depicts an exemplary process flow according to an embodiment of the invention.

Referring to FIG. 7 there is depicted an exemplary Process Flow 700 according to an embodiment of the invention wherein a text entry process may be transferred from a first device to a second device based upon whether a transfer condition between the first device and a remote system is met or not. Accordingly, as depicted the process comprises first to third sub-flows 7000A to 7000C respectively together with first to third steps 710 to 730, respectively. The Process Flow 700 begins with first sub-flow 7000A comprising a sequence of steps relating to establishing a remote session, an application within the remote session and determining whether a transfer condition has been met or not. Accordingly, first sub-flow 7000A may, for example, comprise first to third steps 605 to 615 and seventh to ninth steps 635 to 645 of Process Flow 600 in FIG. 6.

If the transfer condition value is not met, then the process proceeds to first step 710 otherwise it proceeds to second sub-flow 7000B. Second sub-flow 7000B comprising, for example, a similar process such as described above in FIG. 6 by the sequence of third to sixteenth steps 615 to 680 respectively, such that text entry proceeds on the client device in dependence upon whether a data transfer condition is met or not. In first step 710 a determination is made as to whether there is a second device either associated with the first device being used by the user or the user. Upon a negative determination the process proceeds to third step 730 and stops whilst a positive determination results in the process proceeding to second step 720 and then third sub-flow 7000C. In second step 720 a remote session with the second device is established transferring the entry of text into fields of the GUI from the client device to the associated device. In third sub-flow 7000C a similar process such as described above in respect of FIG. 6 by the sequence of third to sixteenth steps 615 to 680 respectively, such that text entry proceeds on the second device in dependence upon whether a data transfer condition is met or not. Completion of the text entry and transmission to the remote session in either of second or third sub-processes 7000B and 7000C results in Process Flow 700 proceeding to third step 730 and stopping.

Within an embodiment of the invention the second device may be a mobile device, such as Mobile Device 210 in FIG. 2, the client device may be Client Device 220 in FIG. 2 and the remote system the Remote Access System 230 in FIG. 2. Alternatively, within an embodiment of the invention the client device may be a PED, such as Mobile Device 210 in FIG. 2, the second device may be Client Device 220 in FIG. 2 or another PED, FED, Wearable Device and the remote system the Remote Access System 230 in FIG. 2.

Accordingly, Process Flow 700 provides for the transfer of a text entry process to a second device if a data transfer condition is met or not wherein the data entry process proceeds solely upon either the first device or the second device. However, it would be evident that within another embodiment of the invention where the text entry is being performed upon the first device in a variant of second sub-flow 7000B when the data transfer condition is not met the process proceeds to second step 720 and third sub-flow 7000C so that remaining text entry is performed upon the first device. Examples of processes relating to the transfer of an active remote session from one device to another may be found, for example, within U.S. patent application Ser. No. 15/458,305 entitled: Seamless Cross-Platform Synchronization of User Activities and Application Data between Mobile and Desktop Devices."

Figure 8:
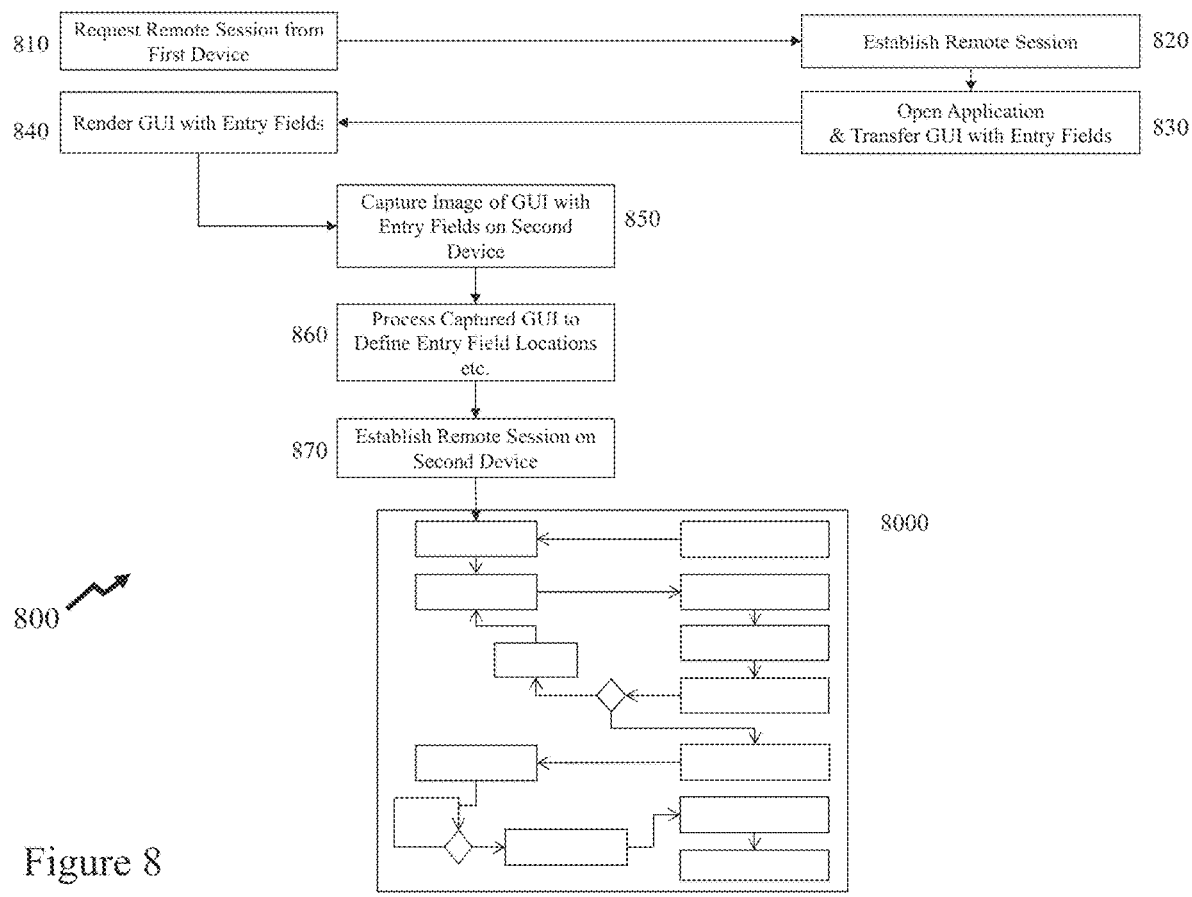
FIG. 8 depicts an exemplary process flow according to an embodiment of the invention.

Now referring to FIG. 8 there is depicted an exemplary Process Flow 800 according to an embodiment of the invention for text entry into a GUI within a remote session wherein the text entry is performed on a different device to the device which establishes the remote session with the remote system. Accordingly, as depicted Process Flow 800 comprises first to seventh steps 810 to 870 and sub-flow 8000. Accordingly, first to seventh steps 810 to 870 comprise:

First step 810 wherein a remote session request is made from a first device;
Second step 820 wherein the remote session is established;
Third step 830 wherein the remote session establishes the application requested from the first device and transfers a GUI to the first device comprising entry fields;
Fourth step 840 where the first device renders the GUI;
Fifth step 850 wherein an image of the rendered GUI is captured upon a second device;
Sixth step 860 wherein the captured image of the rendered GUI is processed to establish the entry field locations etc.; and
Seventh step 870 wherein a further remote session is established between the second device and the remote system.

From seventh step 870 the process proceeds to sub-flow 8000, comprising a process such as described above in FIG. 6 by the sequence of third to sixteenth steps 615 to 680 respectively, such that text entry proceeds in dependence upon whether a data transfer condition is met or not etc. Text entry upon the second device may be implemented, for example, through the provisioning of a browser plug-in that renders the captured GUI image and allows the user to indicate fields and enter text which is rendered and stored. It would be evident that this entered field text data may be stored encrypted wherein the decryption key is help by the remote system. Alternatively, a thin client may be installed and in execution upon the second device to manage the entry of text into the fields of the rendered GUI. Accordingly, Process Flow 800 provides for the entry of text into fields of a GUI by a user upon a second device whilst the remote session to which the text entry relates is upon a first device. Accordingly, a user may for example login in to software applications, establish remote sessions etc. upon the first device, e.g. a PED or a FED, based upon text entry into a second device, e.g. a PED associated with the user such as their smartphone for example, such that they do not enter the text, e.g. credentials, sensitive information etc., upon the first device. An application or thin client in execution upon the user's second device may capture the rendered GUI image and establish the second session within embodiments of the invention. Alternatively, an application or thin client executing in background may process captured images, determine the image is a GUI with text entry fields and trigger the process. The image processing of the captured image of the rendered GUI may exploit a variety of image processing, image enhancement techniques etc. as well as one or more machine learning and/or artificial intelligence processes to define the image locations and/or establish requirements for the entered text. For example, referring to seventh block 470 in FIG. 4 the field for "Account Number" has additional text indicating that the "Account Number" should start with 4xxxx801xx and must be 20 digits long."

Within an alternate Process Flow 800 where the remote session in third step 830 is established through a web browser, such as Google™ Chrome for example, a browser plug-in may have been previously installed for the browser. In this instance, when, in fourth step 840 the GUI is rendered fifth and sixth steps 850 and 860 may be replaced by a process which extracts the required information from the original electronic content received, e.g. from text within the electronic content or elements of the hypertext markup language (HTML) of the electronic content. Accordingly, within embodiments of the invention a software application may determine whether a browser plug-in is installed and initially seek to extract the required information prior to capturing an image of the rendered GUI and processing it.

Within seventh step 870 the further remote session may be a new remote session established with the remote system which employs data provided by the second device to associate the new remote session with the application, content, current status of the original remote session from the first device. Alternatively, the further remote session may be a transfer of the remote session of the first device to the second device, wherein when the second device takes over the first device is disconnected.

Figure 9:
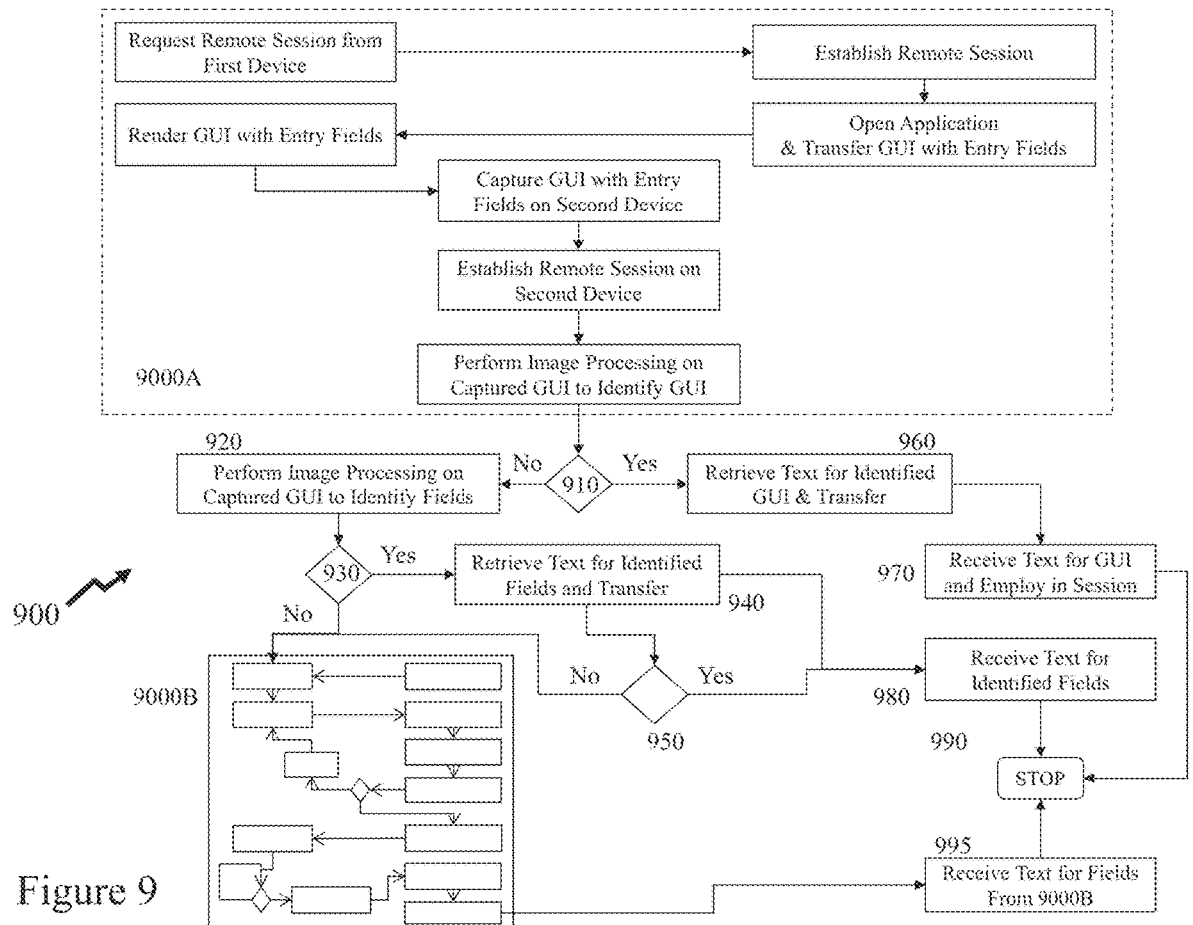
FIG. 9 depicts an exemplary process flow according to an embodiment of the invention.

Referring to FIG. 9 there is depicted an exemplary Process Flow 900 according to an embodiment of the invention comprising first and second sub-flows 9000A and 9000B with first to tenth steps 910 to 995, respectively. The process begins at first sub-flow 9000A which executes a process similar to that described and depicted by first to seventh steps 810 to 870 Process Flow 800 in FIG. 8 wherein a user establishes a remote session upon a remote system with a first device, captures an image of a rendered GUI with data entry fields upon a second device and a second session with the remote system is established with their second device. However, rather than establishing the text entry locations the image processing within first sub-flow 9000A identifies the GUI being rendered.

Then in first step 910 the Process Flow 900 determines whether the identified GUI is one the user has previously entered text for or not. If yes, then the process proceeds to sixth step 960 otherwise it proceeds to second step 920. In sixth step 960 the process retrieves the previously entered text for the identified GUI and transfers it to the remote session wherein in seventh step 970 the remote session receives and employs the received text for the fields within the GUI and proceeds to ninth step 990 and stops. Accordingly, in this branch the process may execute automatically or upon user approval to retrieve and employ the previously stored text for the fields within the rendered GUI.

If the process proceeds to second step 920 then image processing is applied to identify the fields wherein the process then proceeds to third step 930 to determine whether existing text entries for these fields exists or not. If yes, the process proceeds to fourth step 940, otherwise it proceeds to second sub-flow 9000B. Second sub-flow 9000B, for example, comprising a process such as described above in FIG. 6 by the sequence of third to sixteenth steps 615 to 680 respectively, such that text entry proceeds in dependence upon whether a data transfer condition is met or not etc. Upon completion of second sub-flow 9000B the process proceeds to tenth step 995 wherein the remote session receives the text entered by the user and proceeds to stop in ninth step 990.

In fourth step 940 the retrieved text for identified fields is retrieved and transferred to the remote session before the process proceeds to fifth step 950 to determine whether all fields have text retrieved or not. If yes, the process proceeds to eighth step 980 wherein the remote session receives and then the process stops in ninth step 990, otherwise it proceeds to second sub-flow 9000B etc.

Accordingly, Process Flow 900 allows automatic population of text entry fields into a GUI within a remote session where the GUI associated with the text entry fields is identified and the user has both previously entered text for the entry fields and approved automated population. The process may be automatic based upon a previous approval, approved each time or approved only for specific fields within the GUI requiring that other fields be entered by the user.

With the process portion associated with second step 920 and fourth step 940 fields are identified and text retrieved for entry. However, it would be evident that a text entry field "Username" may have multiple options for the user when the GUI to which the field relates is not recognized.

Process Flow 900 is described and depicted with respect to the previously entered text being retrieved and transferred. Within embodiments of the invention this may be retrieved from storage associated with the first device the user establishes the remote session with. Within other embodiments of the invention this may be retrieved from storage associated with the remote system with which the user establishes the remote session with so that no transfer from the user's first device to the remote system of previously entered text is performed, only that additional text required where the GUI is not recognised as having previously processed or there are fields missing. Within embodiments of the invention this may be retrieved from storage associated with another device associated with the user of the first device establishing the remote session with and this may be transferred to the remote session via the first device or via a second communications path from the other device together with an identifier of the remote session entered by the user upon the other device, acquired by the second device from the first device etc. It would be evident that a database may be maintained, within embodiments of the invention, at a device, devices, or distributed that identifies GUIs for which text entry has been previously performed. As will become evident below in respect of FIGS. 11 and 12 some fields may not have text stored as these are deemed sensitive or their automatic use is blocked based upon another condition being met, such that for example, a text entry for a password is blocked unless a particular geofence condition is met. For example, a user's work related password may be automatically employed within their work based upon a geofence but not automatically populated outside the geofence requiring the user to enter it in these instances.

Within FIG. 9 first sub-flow 9000A is described and depicted with respect to capture of the rendered GUI upon a second device wherein the remainder of the process then executes. However, it would be evident that within another embodiment of the invention the image may be captured by the first device which establishes the first session and that the remainder of the process may therefore be executed upon the first device. The Process Flow 900 in FIG. 9 being a flow with increased security as the process of generating and entering text for the remote system is upon a different device to that upon which the software application is being accessed in the first remote session in a similar manner that one-time passwords etc. are generated upon a different electronic device and may be provided by the different electronic device to which the user is logging in and requires the one-time password.

Figure 10:
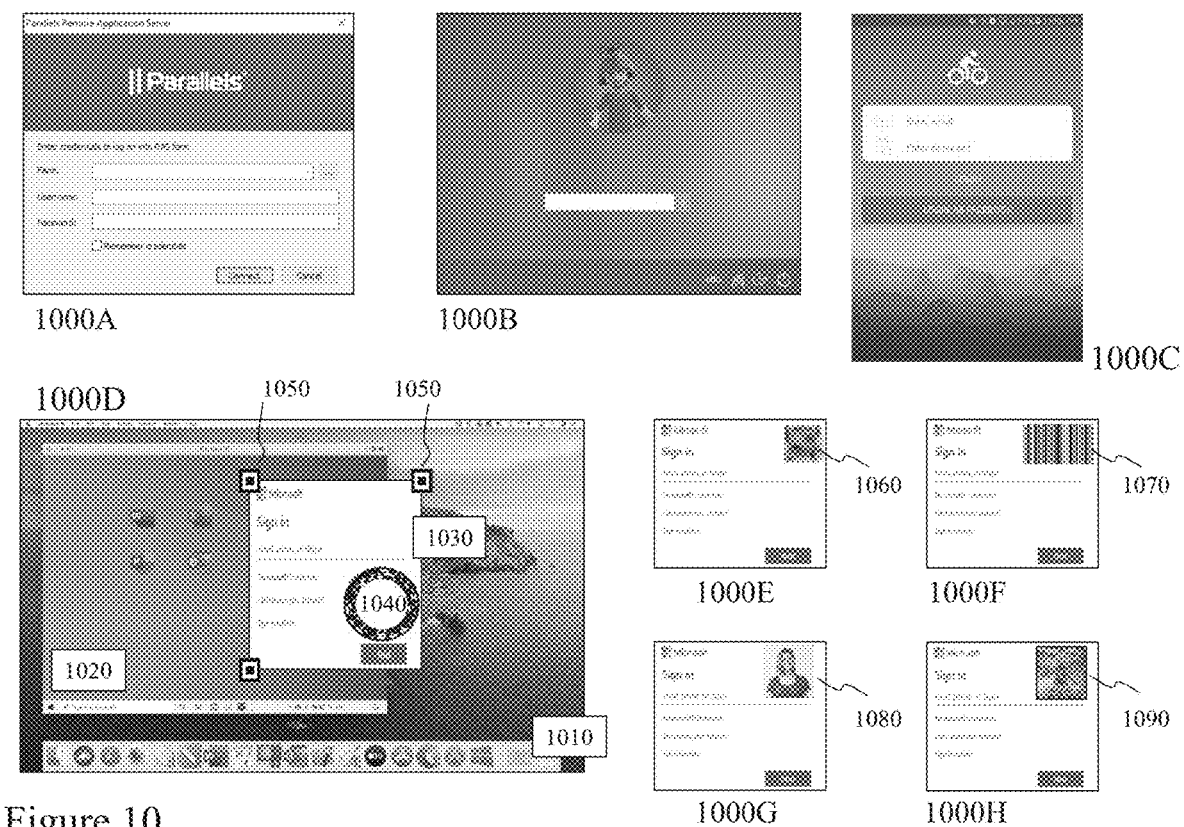
FIG. 10 depicts exemplary software application images with and without the addition of additional information for the local device to identify the application accessed by the user and/or a specific graphical user interface (GUI) of the application.

FIG. 10 depicts exemplary software application images, first to eighth images 1000A to 1000H respectively, with and without the addition of additional information for the local device to identify the application accessed by the user and/or a specific graphical user interface (GUI) of the application. Accordingly, first image 1000A relates to Parallels™ Remote Application Server wherein the processing of the captured GUI would be able to isolate the text and identify the software application and the fields as these are clearly identified by text. Second image 1000B relates to Microsoft™ Windows login where the image processing would learn that this is relates to this application as there is no identifying text etc. based upon the user entering text and either identifying the application to the software through additional steps or the software processing subsequent GUIs to determine the application.

Third image 1000C relating to a mobile application wherein the machine learning/artificial intelligence processes may establish the application by image processing and matching key elements with published images of this application. In this example, the image of the bike rider and stylized mountains. However, in this instance the machine learning/artificial intelligence processes may also identify the text "Login as Facebook" and trigger selection of this GUI icon and the subsequent entry of user information for Facebook™ rather than the application opened;

Fourth image 1000D relating to a desktop GUI 1010 within a browser GUI 1020 for a remote session, e.g. via Parallels Desktop to a remote system, executing Parallels Remote Application Server for example, wherein an Entry GUI 1030 relating to the user signing into an application within the remote session is rendered. However, the default application Entry GUI 1030 is augmented by the remote session with Barcode 1040 and GUI Locators 1050. The GUI Locators 1050 define a boundary of the image processing to reduce the workload of image processing by defining a specific region of the GUI to process associated with the Entry GUI 1030. Barcode 1040 further simplifies the image processing as the image processing now can identify a defined barcode according to a standard and extract the information from this. The Barcode 1040 being as an annular barcode although it would be evident that other barcodes as known in the art may be employed. Optionally, an application specific barcode format may be employed rather than one defined by a national or international standard. Optionally, a barcode may be encrypted requiring a decryption key to decode the contents. Fifth and sixth images 1000E and 1000F respectively depict text entry GUIs with two-dimensional (2D) barcode 1060 and one-dimensional (1D) barcode 1070 respectively which may encode data identifying the GUI discretely; data identifying the GUI and software application; data identifying the GUI, software application and fields to be filled; or data identifying the fields to be filed and any specific requirements for one or more of these fields (e.g. a format, a number of characters, etc.)

Seventh and eighth images 1000G and 1000H depict text entry GUIs with user defined first and second graphical images 1080 and 1090 respectively rather than an image, barcode etc. defined by one or more of the remote system, software application, GUI content, for example. Accordingly, within an embodiment of the invention where a GUI has not been previously rendered, captured and analysed the user would be required to enter text as outlined above but may also be asked to associate an image with the GUI which is then stored in association with the entered text and transmitted to the remote system for association with that GUI for that software application. Accordingly, subsequently the remote system with the remote session when rendering the GUI to the user at a subsequent point in time may also render the associated image such that the subsequent recognition on the user's device identifies the image, matches it to one stored, and retrieves the stored text associated with this image. Accordingly, the same GUI requiring the same text may have multiple images associated with different text entry. The image employed by the remote session may, for example, be determined based upon a context of the user's device, such as time, date, or location for example. For example, first graphical image 1080 (in this instance an image of person) is associated with the software application when the user's device is outside of a geofence defined by their employer, and second graphical image 1090 (an image of the Kremlin) is associated with the software application when the user's device is inside this geofence. Optionally, the remote system may associate images rather than barcodes or may associate other digital content including, but not limited to, an audio file, a video file, a computer generated image, or a fractal. In the instances of an audio file or video file the content may be rendered and analysed by the software in a similar manner as a static image to identify the software application, text entry fields etc.

Within the preceding embodiments of the invention as described and depicted with respect to FIGS. 6 to 10 a user enters text into an entry field which is then stored allowing its subsequent reuse to automatically populate the same GUI again, another GUI, etc. However, it would be evident and as indicated above that some text entered by the user may be what the inventors refer to as "sensitive" which should not be stored. Accordingly, referring to FIG. 11 there is depicted an exemplary Process Flow 1100 for content provisioning according to an embodiment of the invention with removal of sensitive data. As depicted Process Flow 1100 comprises first to sixth steps 1110 to 1160, which comprise:

First step 1110 wherein the user requests a remote session from their user device;

Second step 1120 wherein the user device detects the remote content for the remote session;

Third step 1130 wherein the user entered text within the remote session is detected;

Fourth step 1140 wherein the user entered text is associated with fields in the software application in execution within the remote session;

Fifth step 1150 where sensitive data is excluded; and

Sixth step 1160 wherein the user entered content after removal of the sensitive data is stored together with the associations of the fields and/or software application.

Within embodiments of the invention the removal of sensitive data may be based upon the user indicating which text is sensitive. Within other embodiments of the invention the removal of sensitive data may be based upon the application of one or more rules associated with one or more of the software application, the remote session, and the remote system. A rule may be established by, for example, the user, a licensee of the software application accessed by the user (e.g. an employer of the user who has licensed the software application), a service provider, a regulatory authority, and/or a Government entity. Accordingly, an employer may define passwords as sensitive data whilst a Government entity might define the address of a child as sensitive. Accordingly, a field may within one software application in one context be defined as sensitive but not within another software application in the same context. The context may in addition to factors such as time, date, location, etc. also include text entered into another field of the GUI. In this manner, for example, a user's password to their work email in Microsoft™ Outlook may be defined as sensitive based upon the user's username whilst their password to their personal email in Microsoft™ Outlook is not defined as sensitive.

Figure 11:
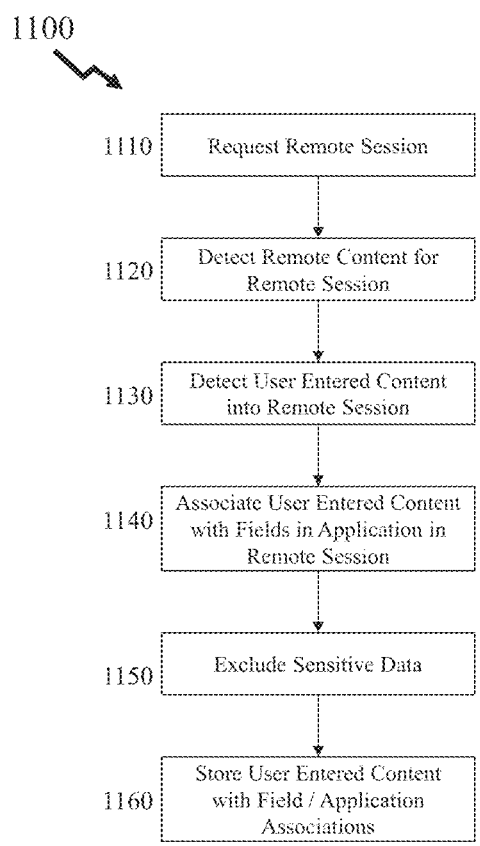
FIG. 11 depicts an exemplary process flow for content provisioning according to an embodiment of the invention.
Figure 12:
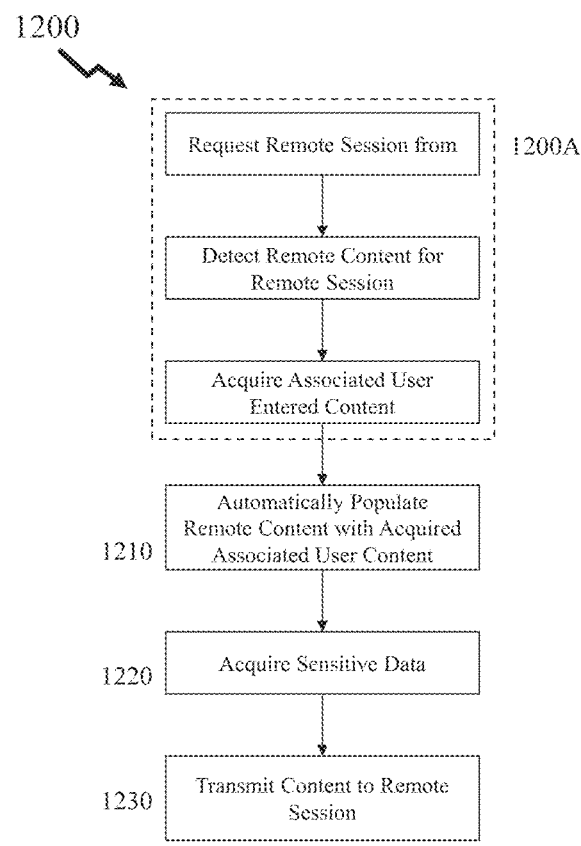
FIG. 12 depicts an exemplary process flow for content provisioning according to an embodiment of the invention.

Accordingly, it would be evident that the processes described above in respect of automatically populating text fields within a GUI may require the user to enter data where this has been removed from their previous entry by virtue of being defined as sensitive. Referring to FIG. 12 there is depicted an exemplary Process Flow 1200 for content provisioning according to an embodiment of the invention in this scenario. Process Flow 1200 comprising sub-flow 1200A and first to third steps 1210 to 1230 respectively wherein first and second steps 1210 and 1220 may for example replace sixth step 960 in FIG. 9. As depicted:

Sub-flow 1200A comprises steps equivalent to first to third steps 1110 to 1130 in FIG. 11;

First step 1210 wherein the fields of the GUI are automatically populated with the previously acquired and stored user content (previous text entry);

Second step 1220 wherein the process identifies fields for which user input is required, e.g. sensitive data fields, where if this data was entered previously by the user in a previous remote session it has been removed by virtue of being defined as sensitive; and Third step 1230 wherein the retrieved and entered content is stent to the remote session to complete the process associated with the GUI, e.g. a login screen, registration etc.

Figure 13:
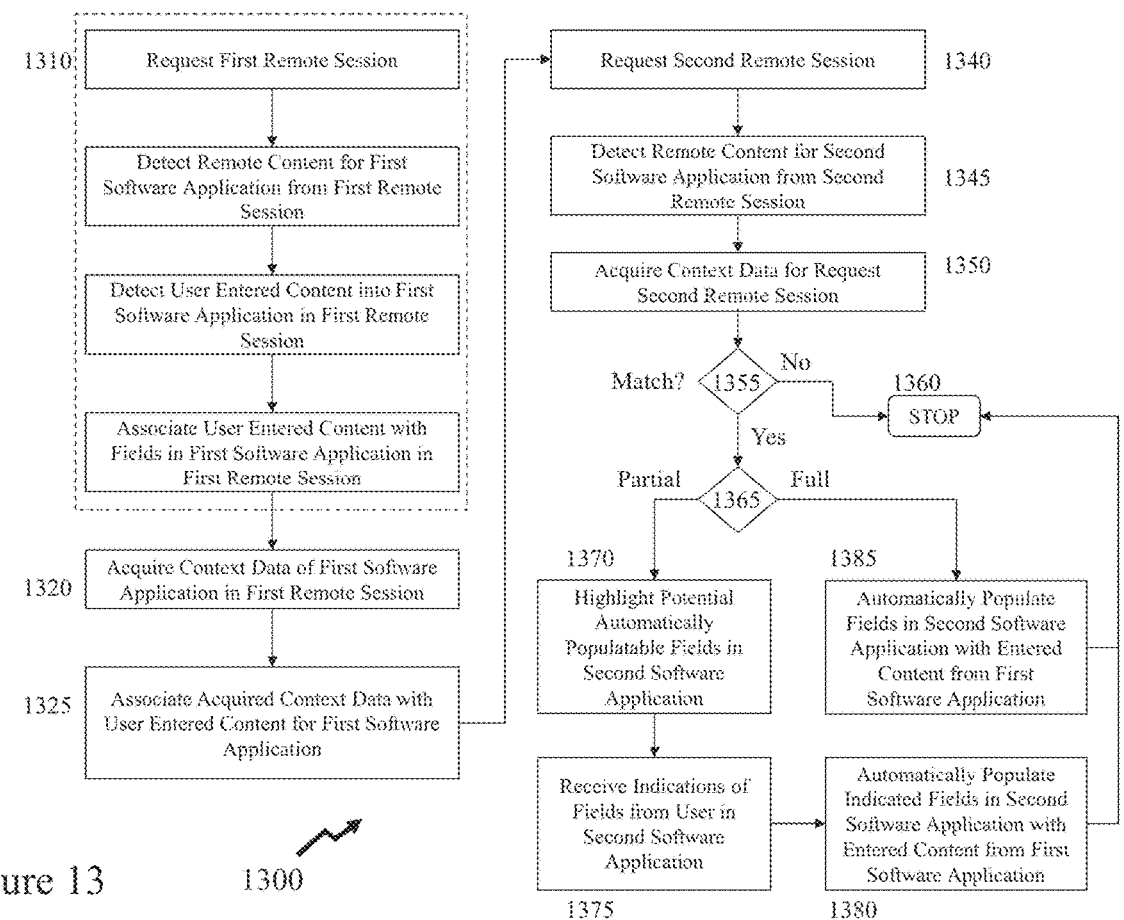
FIG. 13 depicts an exemplary process flow for populating fields within a software application according to embodiments of the invention.

Now referring to FIG. 13 there is depicted an exemplary Process Flow 1300 for populating fields within a software application according to embodiments of the invention wherein entered content within fields is associated with a context and may be employed within another software application within another remote session based upon matching of the context data. Accordingly, as depicted Process Flow 1300 comprises sub-flow 1310 and first to twelfth steps 1320 to 1385 respectively, wherein sub-flow 1310 comprises the sequence of requesting a first session, detecting content for first software application from the first remote session, detecting user entered content and associated the user entered content to the fields within the first software application. Now referring to first to fifth steps 1320 to 1350 these comprise:

First step 1320 wherein context data associated with the user's entry of text within the first software application in the first remote session is established;

Second step 1325 wherein this context data is associated with the user entered content of the first software application;

Third step 1340 wherein the user subsequently requests a second remote session for a second software application;

Fourth step 1345 wherein the content for the second software application from the second remote session is detected; and Fifth step 1350 second context data associated with the user's request for the second software application in the second remote session is established.

Now referring to sixth to twelfth steps 1355 to 1385 these comprise:

Sixth step 1355 wherein it is determined whether a match of the second context data associated with the user's request for the second software application in the second remote session to the first context data associated with the user's request for the first software application in the first remote session is made and the process proceeds to either seventh step 1360 or eighth step 1365;

Seventh step 1360 wherein the match is not determined made and the process stops;

Eighth step 1365 wherein the match is determined and a subsequent decision is made as to whether a full automatic population or a partial automatic population can be performed wherein the process proceeds to either ninth step 1370 or twelfth step 1385 respectively;

Ninth step 1370 where automatically populatable fields within the GUI of the second software application are highlighted to the user;

Tenth step 1375 wherein the Process Flow 1300 receives indications of those fields which can be automatically populated from the user;

Eleventh step 1380 wherein those fields identified by the user as being auto-populatable are automatically populated and the process proceeds to seventh step 1360; and Twelfth step 1385 wherein the automatically populatable fields are auto populated and the process proceeds to seventh step 1360.

It would be evident at not all fields may be automatically populated in twelfth step 1385 or even if the user identifies all highlighted automatically populatable fields in tenth strep 1375 that other fields may require text entry. This may be as they have been defined as containing sensitive data as described above or that one or more fields in the second software application were not present in the first software application. Accordingly, whilst not depicted for clarity Process Flow 1300 may proceed to receive additional user entered text after eleventh and twelfth steps 1380 and 1385, respectively. This being by one or more embodiments of the invention.

Figure 14:
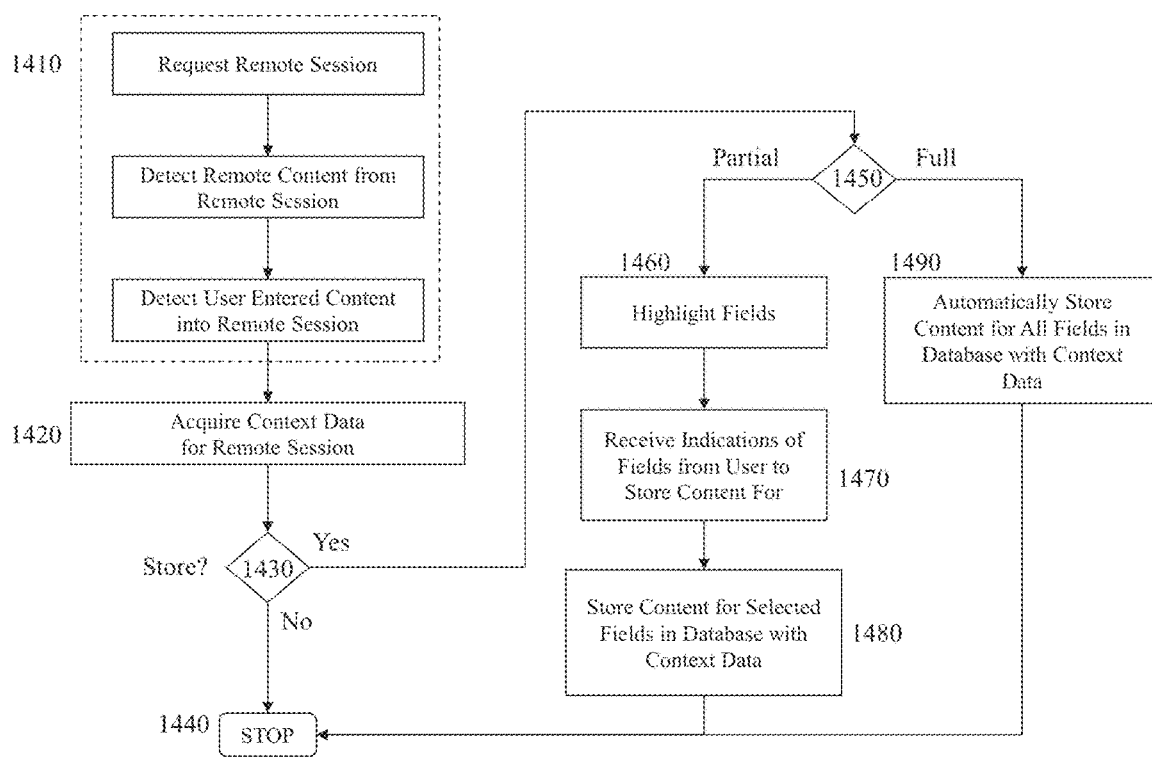
FIG. 14 depicts an exemplary process flow for selecting fields within a software application according to embodiments of the invention.

Now referring to FIG. 14 there is depicted an exemplary Process Flow 1400 for selecting fields within a software application according to embodiments of the invention for which user entered content will be stored for subsequent use. As depicted Process Flow 1400 comprises sub-flow 1410 and first to eighth steps 1420 to 1490, respectively. Sub-flow 1410 comprises equivalent steps to first to third steps 1110 to 1130 respectively in Process Flow 11 of FIG. 11 where a user creates a remote session and enters content into a GUI. First to eighth steps 1410 to 1490 comprising:

First step 1420 wherein context data for the user's remote session;

Second step 1430 wherein a determination is made as to whether the user entered text into the GUI should be stored or not wherein the process proceeds to third step 1440 and stops if not otherwise it proceeds to fourth step 1450;

Third step 1440 wherein the process stops;

Fourth step 1450 wherein a determination is made as to whether a full or partial storage of the user entered content is to be made wherein the process proceeds to either eighth step 1490 or fifth step 1460 respectively;

Fifth step 1460 wherein the fields for which user entered content have been made are highlighted;

Sixth step 1470 wherein the user establishes indications of which fields content will be stored for;

Seventh step 1480 wherein the content for the fields selected by the user is stored and the process proceeds to third step 1440 and stops; and Eighth step 1490 wherein the content for all fields is stored and the process proceeds to third step 1440 and stops.

Accordingly, Process Flow 1400 allows a user to define which fields in a GUI will have their content stored. It would be evident that within embodiments of the invention the highlighting of fields for which entered content may be stored may be based upon one or more rules associated with one or more of the software application, the remote session, and the remote system. A rule may be established by, for example, the user, a licensee of the software application accessed by the user (e.g. an employer of the user who has licensed the software application), a service provider, a regulatory authority, and/or a Government entity. Accordingly, an employer may define that a field for a password as being a field that cannot be highlighted and stored whilst a Government entity might define the address of a child as sensitive. Optionally, the highlighting of fields for which entered content may be stored may be based upon the context of the user when establishing the remote session such that, for example, a user cannot define some fields for storage in one context, e.g. their electronic device is wirelessly connected to a network, but can within another, e.g. their electronic device is attached to a wired corporate network.

Accordingly, it would be evident that embodiments of the invention provide for processes, methods, and system for improving remote form filling, e.g. text entry into a GUI displaying a form within a remote session, particularly in instances where the user is accessing the remote session on a PED or Wearable Device, i.e. a mobile device without all the features/user interfaces etc. necessarily of a FED or a semi-portable PED such as a laptop. As described and depicted embodiments of the invention may exploit software providing one or more functions including, but not limited to, capturing text content entered by a user, storage of text content with or without associations such as software application or context, image processing to determine the GUI rendered to a user as part of a remote session, an automated filling of content within a GUI, semi-automated filling of content within a GUI, removal of sensitive data, automatic determination of sensitive data based upon one or more rules, and the entry of text content into a second application within a second remote session in dependence upon previously entered content by the user in a first software application within a first remote session.

Accordingly, embodiments of the invention may either be employed to auto-populate a GUI or to allow a user to continue populating a GUI when a connection is lost or network latency is high, for example. In the prior art, considering a mobile device, which runs a remote access application, which is managed to access a remote computer then an application allows input to be initiated by user and consequently transmitted character by character to the remote computer whilst the user sees a GUI from the remote computer which displays the user input. A failed network connection, even temporarily, means the user must restart the process. In contrast, embodiments of the invention recognize user entered content and its association to the GUI allowing the user to keep the text in memory so that either the form can be auto filled with previously entered text or the user can maintain completion of the form or restart where they left off in the event of a failed connection.

Further, embodiments of the invention allow for either the user and/or an enterprise/organization etc. to define rules for sensitive data as some data should be saved to protect either user privacy and/or avoid data leakage/loss.

As noted above embodiments of the invention exploit that the remote client knows what application is being rendered in the GUI and what is its context. Accordingly, the software can start trying to run text recognizer in order to save the filled text form in association with key value. A key value being, for example, the name of the text field the text was entered into or a position and value of the field within the GUI. Accordingly, embodiments of the invention provide for processes comprising detection of remote content, text recognition, association with key value and/or context, exclusion of sensitive data, and where appropriate substitution. Embodiments of the invention provide for the user and/or the remote with the means clear and remove any sensitive data stored locally on the device or at the remote system.

Within embodiments of the invention the remote client might have no access to the content of the remote computer program, however it knows exactly what text input the user performs and can act as a device side agent, which helps to recognize text areas and keep track of the input, performed on device side.

Embodiments of the invention are not restricted to which software application(s) they can identify text entry and perform the other aspects of embodiments of the invention. Embodiments of the invention are not limited to sessions hosted through a web browser.

Embodiments of the invention are not limited to any specific language or family of languages. Accordingly, the embodiments of the invention can work with the Latin family of languages, Arabic, Cyrillic, Chinese, and Japanese. Further, as the user's entry is tracked it can also work with non-language based elements such as emoji etc. accessible to users of devices within software applications as alternate "characters."

Whilst the embodiments of the invention have been described with respect to text input into fields within a GUI it would be evident that the embodiments of the invention may also be applied to a form, a form within a GUI, or any portion of rendered electronic content rendered within a GUI etc. Further, whilst the embodiments of the invention have been described with respect to text input it would be evident that these methods and systems may also be employed with other means of entering (providing) content including, but not limited to, visual means, audible means, sign language etc.

Figure 15:
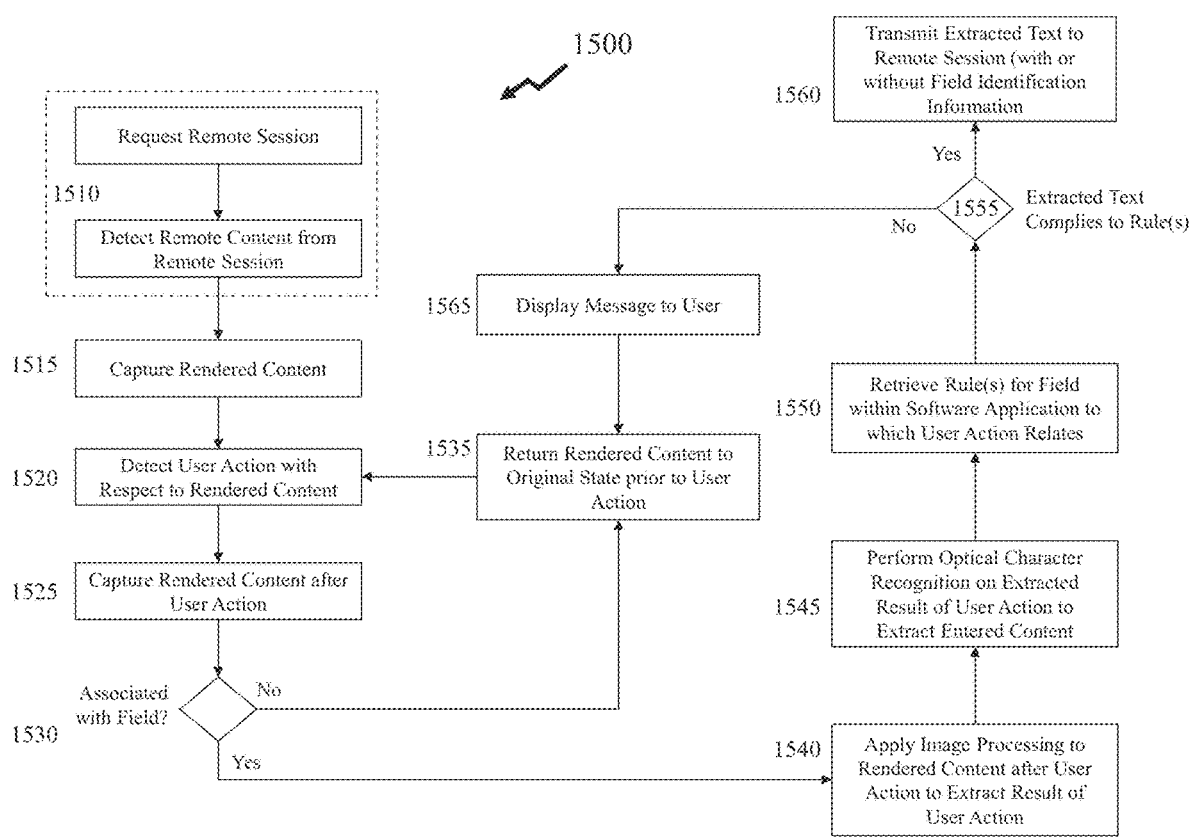
FIG. 15 depicts an exemplary process flow for text entry based upon acquisition of the entered text from alternate sources.

Whilst the embodiments of the invention have been described with respect to the entry of text within fields it was not explicitly stated how this text was entered. Accordingly, an assumption may have been made that the text entry within the preceding descriptions with respect to FIGS. 5 to 14 was made via a physical keyboard, such as Keyboard 115 in FIG. 1 for example, or a virtual keyboard implemented in a touch sensitive interface, such as Touchpad 117 in FIG. 1 for example. However, embodiments of the invention may support the entry of text from multiple sources using alternate capture mechanisms for text entry rather than monitoring the keystrokes of a physical keyboard. For example, alternate text entry mechanisms may include, but not be limited to, human interface devices (HIDs), clipboards, another remote client to that hosting the remote session, another application within the same remote session, and a virtual device. Accordingly, an exemplary embodiment of the invention for such text entry from multiple sources is presented in FIG. 15 with Process Flow 1500 comprising first to twelfth steps 1510 to 1565, respectively.

As depicted first to sixth steps 1510 to 1535 comprise:
First step 1510 wherein the user requests a remote session and the local device of the user detects the remote content from the remote session;
Second step 1515 wherein the rendered content of the remote session is captured;

Third step 1520 wherein a user action with respect to the rendered content is detected;

Fourth step 1525 wherein the rendered content after the user action is captured;

Fifth step 1530 wherein a determination is made as to whether the user action was respect to a field within the GUI wherein if so the process proceeds to seventh step 1540 otherwise it proceeds to sixth step 1535; and Sixth step 1535 wherein a determination that the user action was not with respect to a field within the GUI results in the rendered content being returned to its original state prior to the user action.

Having determined a user action was made with respect to a field in fifth step 1535 Process Flow 1500 proceeds to seventh to twelfth steps 1560 respectively, which comprise:

Seventh step 1540 wherein one or more image processing algorithms are applied to the rendered content to extract the result of the user action, for example to extract that portion of the rendered content with the user entered text and processed to enhance contrast etc.;

Eighth step 1545 wherein the extracted portion of the rendered content is now processed with one or more optical character recognition (OCR) algorithms to extract character based content;

Ninth step 1550 wherein a rule or rules associated with the field such as discussed above wherein a field may have a particular format, minimum number of characters, required combination of alphanumeric characters (e.g. at least one number), required combination of alphanumeric characters and special characters (e.g. at least one special character);

Tenth step 1555 wherein the OCR'd content extracted is compared to the rule(s) retrieved in ninth step 1550 wherein if the determination is that it complies then the process proceeds to eleventh step 1560 otherwise it proceeds to twelfth step 1560;

Eleventh step 1560 wherein the OCR'd content is transmitted to the remote session as entered content for that field (together with an indication of the field to which the text relates in some embodiments of the invention); and Twelfth step 1565 wherein a display message is rendered to the user indicating that the entered text does not comply with the rule(s) for the field to which it relates.

Accordingly, any text entry mechanism based upon a user action triggers a second capture and a comparison to determine whether the user action was associated with a field in the rendered content, e.g. a copy-paste, cut-and-paste, keyboard entry, virtual keyboard entry, entry from a clipboard(s) etc. Optionally, within another embodiment of the invention third step 1520 which is a user based trigger is replaced with another trigger such as the detection of an action with respect to the rendered content, e.g. from another remote client, another application within the same remote session, another application in execution on the local device, and a virtual device such that this action once triggering second step 1520 results in a determination as to whether the action related to a field. Optionally, within another embodiment of the invention third step 1520 which is a user based trigger is replaced with a time based trigger such that detection of an action per se is not required and any variation arising from an entry leading to a change in the rendered image of a field will trigger the determination in fifth step 1530 to advance the process to seventh step 1540. In each of these alternate embodiments sixth step 1535 returns the rendered content to a previous state prior to the trigger or may be removed so that the process loops around directly back to third step 1520.

Within the preceding description with respect to embodiments of the invention and reference to FIGS. 6 to 15 acquisition of data relating to fields within which text entry is required within a GUI rendered to a user have been primarily described with respect to capturing an image of the rendered GUI, applying image processing and/or optical character recognition processes to the captured image. However, as noted with respect to Process Flow 800 and FIG. 8 alternate methodologies may be exploited. Accordingly, the rendered GUI may rendered within a web browser, such as Google™ Chrome for example, either a result of navigating to a web page or accessing an application through a remote a browser plug-in, previously installed for the browser, is employed. Accordingly, this browser plug-in may extract the required information from the original electronic content received, e.g. from text within the electronic content or elements of the hypertext markup language (HTML) of the electronic content. Optionally, the browser plug-in may be downloaded and installed once a form or other GUI requiring user text entry has been rendered. Alternatively, a software application rendering a GUI may extract the required information. In either scenario where the identification of the text entry fields can be performed upon electronic content received, or locally stored, rather than by processing a captured GUI image then embodiments of the invention may exploit these methodologies where the GUI is rendered and the fields populated. However, it would also be evident that such methodologies allow for the text field data to be associated with the text fields and transmitted to a remote system without rendering the GUI to the user. In these instances, the processes associated with the receipt of content with fields requiring user text entry may be automatically executed and be invisible to the user. Optionally, a user may be able to select such an option, with respect to a browser plug-in for example, so that where processes can be automated and performed invisibly they are. Alternatively, the user may wish these processes to be rendered and visible even though they are automatically performed without any input from them.

Whilst within embodiments of the invention the rendering of a GUI and the capturing of an image of the rendered GUI have been described and depicted with respect to the same electronic device it would be evident that within other embodiments of the invention the GUI may be rendered upon a first electronic device but the image capture and processing are performed upon a second electronic device wherein the resulting text for the identified text fields for which content has been previously stored is transmitted to the first electronic device to employ within the rendered GUI. However, within another embodiment of the invention if the user is accessing a remote system upon the first electronic device then the second electronic device may provide the text directly to the remote system so that the text is not entered upon the first electronic device. Accordingly, a user may for example seek to access their email upon a laptop provided by a business bureau within a hotel. Accordingly, the login screen is captured upon the user's smartphone, processed and the information transmitted to the remote system, e.g. Outlook. Additional data may be rendered in the GUI through a bar code, for example, providing the necessary information for the remote system to associate the text received from the second electronic device (the user's smartphone for example) with the process upon the first electronic device (e.g. login process on the laptop).

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other mediums capable of storing, containing, or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of populating fields within a software application comprising:
   a) establishing a remote session for the software application upon a remote system with a client device associated with a user via a communications network;
   b) establishing a graphical user interface (GUI) upon the client device in dependence upon data provided by the remote session where the GUI comprises a plurality of fields into which text is to be entered; and
   c) entering text into a portion of the plurality of fields of the software application upon the remote system via a first process in execution upon a device and a second process in execution upon the remote system; wherein the device is the client device;
   the first process comprises:
   d) receiving an indication of user entered text for a field of the plurality of fields;
   e) transmitting the indication of user entered text to the remote system;
   f) establishing a current transfer condition value with respect to the aspect of data transfer between the remote system and the client device for the user entered text based upon the current communications between the client device and the remote system;
   g) determining whether a condition is met in dependence upon the current transfer condition value and a threshold data transfer condition value;
   h) upon determining the condition has not been met proceeding to step (m);
   i) upon determining the condition has been met executing a sequence comprising the steps of:
      j) continuing to receive indications of user entered text for other fields of the plurality of fields;
      k) transmitting the indications of user entered text for other fields of the plurality of fields; and
      l) executing a loop back to step (d);
   m) upon determining that the message has been received from the remote system executing another sequence comprising the steps of:
      n) continuing to receive indications of user entered text for remaining fields of the plurality of fields for which indications of user entered text have not yet been received;
      o) storing the received indications of user entered text for the remaining fields of the plurality of fields;
      p) establishing a current transfer condition value with respect to the aspect of data transfer between the remote system and the client device for the user entered text based upon the current communications between the client device and the remote system;
      q) determining whether a condition is met in dependence upon the current transfer condition value and a threshold data transfer condition value;
      r) upon determining the condition has not been met executing a loop back to step (p); and
      s) upon determining the condition has been met transmitting the indications of user entered text for the remaining fields of the plurality of fields when a subsequent determination determines the condition met; and
   the second process comprises:
   t) receiving the indication of the user entered text for the first field of the plurality of fields;
   u) establishing a data transfer condition value with respect to an aspect of data transfer between the remote system and the client device;
   v) establishing a transfer condition value with respect to the aspect of data transfer between the remote system and the client device for the user entered text based upon the current communications between the client device and the remote system;
   w) determining whether a condition is met in dependence upon the transfer condition value and the threshold data transfer condition value;
   x) upon determining the condition is met repeating steps (t) to (v)
   v) upon determining the condition is not met executing a further sequence comprising the steps of:
      z) generating the message; and
      aa) receiving at the later point in time the indications of user entered text for the remaining fields of the plurality of fields when a subsequent determination determines the condition met.

2. The method according to claim 1, wherein
the threshold current data transfer condition value is defined by a geofence or a network latency;
when the threshold current data transfer condition value is defined by the geofence the transfer condition value with respect to the aspect of data transfer between the remote system and the client device is a distance of the client device from a defined location; and
when the threshold current data transfer condition value is defined by the network latency the transfer condition value with respect to the aspect of data transfer between the remote system and the client device is a current latency of communications between the client device and the remote system.

3. The method according to claim 1, wherein the another sequence comprising steps (n) to (s) is performed using a software application installed on the client device.

4. The method according to claim 1, wherein the threshold current data transfer condition value is set to a value forcing the text entry onto the local device thereby suppressing communications between the client device and the remote system during the text entry process.

5. A method of populating fields within a software application comprising:
   a) establishing a remote session for the software application upon a remote system with a client device associated with a user via a communications network;
   b) establishing a graphical user interface (GUI) upon the client device in dependence upon data provided by the remote session where the GUI comprises a plurality of fields into which text is to be entered; and c) entering text into a portion of the plurality of fields of the software application upon the remote system via a first process in execution upon a device and a second process in execution upon the remote system; wherein
the device is the client device;
the first process comprises:
   d) receiving indications of user entered text for a field of the plurality of fields and transmitting the indications of user entered text to the remote system until it is determined that a message has been received from the remote system;
   e) upon determining that the message has been received from the remote system executing another sequence comprising the steps of:
      f) rendering the message upon the client device;
      g) continuing to receive indications of user entered text for remaining fields of the plurality of fields for which indications of user entered text have not yet been received and storing the received indications of user entered text for the remaining fields of the plurality of fields;
      h) determining whether a condition is met in dependence upon a current transfer condition value with respect to the aspect of data transfer between the remote system and the client device and a threshold data transfer condition value;
      i) upon determining the condition is not met executing a loop by going to step (i); and
      j) upon determining the condition has been met transmitting the indications of user entered text for the remaining fields of the plurality of fields when a subsequent determination determines the condition met; and
the second process comprises:
   k) receiving the indications of the user entered text for the field of the plurality of fields;
   l) establishing upon receipt of each indication of user entered text a data transfer condition value with respect to an aspect of data transfer between the remote system and the client device;
   m) establishing a transfer condition value with respect to the aspect of data transfer between the remote system and the client device for the user entered text based upon the current communications between the client device and the remote system;
   n) determining whether a condition is met in dependence upon the transfer condition value and the threshold data transfer condition value;
   o) upon determining the condition is met repeating steps (k) to (m); and
   p) upon determining the condition is not met generating and transmitting the message to be rendered upon the client device.

6. The method according to claim 5, wherein
the threshold current data transfer condition value is defined by a geofence or a network latency;
when the threshold current data transfer condition value is defined by the geofence the transfer condition value with respect to the aspect of data transfer between the remote system and the client device is a distance of the client device from a defined location; and
when the threshold current data transfer condition value is defined by the network latency the transfer condition value with respect to the aspect of data transfer between the remote system and the client device is a current latency of communications between the client device and the remote system.

7. The method according to claim 5, wherein
the another sequence comprising steps (k) to (p) is performed using a software application installed on the client device.

8. The method according to claim 5, wherein
the threshold current data transfer condition value is set to a value forcing the text entry onto the local device thereby suppressing communications between the client device and the remote system during the text entry process.

9. A method of populating fields within a software application comprising:
   a) establishing a remote session for the software application upon a remote system with a client device associated with a user via a communications network;
   b) establishing a graphical user interface (GUI) upon the client device in dependence upon data provided by the remote session where the GUI comprises a plurality of fields into which text is to be entered; and
   c) entering text into a portion of the plurality of fields of the software application upon the remote system via a first process in execution upon a device and a second process in execution upon the remote system; wherein
the first process comprises:
   d) receiving an indication of user entered text for a field of the plurality of fields;
   e) transmitting the indication of user entered text to the remote system;
   f) establishing a current transfer condition value with respect to the aspect of data transfer between the remote system and the client device for the user entered text based upon the current communications between the client device and the remote system;
   g) determining whether a condition is met in dependence upon the current transfer condition value and a threshold data transfer condition value;
   h) upon determining the condition has not been met proceeding to step (m);
   i) upon determining the condition has been met executing a sequence comprising the steps of:
      j) continuing to receive indications of user entered text for other fields of the plurality of fields;
      k) transmitting the indications of user entered text for other fields of the plurality of fields; and
      l) executing a loop back to step (d);
   m) upon determining that the message has been received from the remote system executing another sequence comprising the steps of:
      n) continuing to receive indications of user entered text for remaining fields of the plurality of fields for which indications of user entered text have not yet been received;
      o) storing the received indications of user entered text for the remaining fields of the plurality of fields;
      p) establishing a current transfer condition value with respect to the aspect of data transfer between the remote system and the client device for the user entered text based upon the current communications between the client device and the remote system;
      q) determining whether a condition is met in dependence upon the current transfer condition value and a threshold data transfer condition value;

r) upon determining the condition has not been met executing a loop back to step (p); and
s) upon determining the condition has been met transmitting the indications of user entered text for the remaining fields of the plurality of fields when a subsequent determination determines the condition met; and the second process comprises:
t) establishing a data transfer condition value with respect to an aspect of data transfer between the remote system and the client device;
u) establishing a transfer condition value with respect to the aspect of data transfer between the remote system and the client device for the user entered text based upon the current communications between the client device and the remote system;
v) determining whether a condition is met in dependence upon the transfer condition value and the threshold data transfer condition value;
w) upon determining the condition is met executing establishing the client device as the device such that the first process is performed upon the client device and executing steps (aa) to (ag);
x) upon determining the condition is not met determining whether another device is associated with at least one of the client device and the user;
y) upon determining that there is not another device associated with at least one of the client device and the user stopping the second process;
z) upon determining that there is another device associated with at least one of the client device and the user establishing the another device as the device such that the first process is performed upon the another device and executing steps (aa) to (ag);
aa) receiving the indication of the user entered text for the first field of the plurality of fields;
ab) establishing a transfer condition value with respect to the aspect of data transfer between the remote system and the client device for the user entered text based upon the current communications between the client device and the remote system;
ac) determining whether a condition is met in dependence upon the transfer condition value and the threshold data transfer condition value;
ad) upon determining the condition is met repeating steps (aa) and (ab)
ae) upon determining the condition is not met executing a further sequence comprising the steps of:
af) generating the message; and
ag) receiving at the later point in time the indications of user entered text for the remaining fields of the plurality of fields when a subsequent determination determines the condition met.

10. The method according to claim 9, wherein
the threshold current data transfer condition value is defined by a geofence or a network latency;
when the threshold current data transfer condition value is defined by the geofence the transfer condition value with respect to the aspect of data transfer between the remote system and the client device is a distance of the client device from a defined location; and
when the threshold current data transfer condition value is defined by the network latency the transfer condition value with respect to the aspect of data transfer between the remote system and the client device is a current latency of communications between the client device and the remote system.

11. The method according to claim 9, wherein
the another sequence comprising steps (k) to (p) is performed using a software application installed on the client device.

12. The method according to claim 9, wherein
the threshold current data transfer condition value is set to a value forcing the text entry onto the local device thereby suppressing communications between the client device and the remote system during the text entry process.

13. A method of populating fields within a software application comprising:
a) establishing a remote session for the software application upon a remote system with a client device associated with a user via a communications network;
b) establishing a graphical user interface (GUI) upon the client device in dependence upon data provided by the remote session where the GUI comprises a plurality of fields into which text is to be entered; and
c) entering text into a portion of the plurality of fields of the software application upon the remote system via a first process in execution upon a device and a second process in execution upon the remote system; wherein
the first process comprises:
d) receiving indications of user entered text for a field of the plurality of fields and transmitting the indications of user entered text to the remote system until it is determined that a message has been received from the remote system;
e) upon determining that the message not been received from the remote system executing another sequence comprising the steps of:
f) rendering the message upon the client device;
g) continuing to receive indications of user entered text for remaining fields of the plurality of fields for which indications of user entered text have not yet been received and storing the received indications of user entered text for the remaining fields of the plurality of fields;
h) determining whether a condition is met in dependence upon a current transfer condition value with respect to the aspect of data transfer between the remote system and the client device and a threshold data transfer condition value;
i) upon determining the condition is not met executing a loop by going to step (i)
j) upon determining the condition has been met transmitting the indications of user entered text for the remaining fields of the plurality of fields when a subsequent determination determines the condition met;
the second process comprises:
k) establishing a data transfer condition value with respect to an aspect of data transfer between the remote system and the client device;
l) establishing a transfer condition value with respect to the aspect of data transfer between the remote system and the client device for the user entered text based upon the current communications between the client device and the remote system;
m) determining whether a condition is met in dependence upon the transfer condition value and the threshold data transfer condition value;
n) upon determining the condition is met executing establishing the client device as the device such that the first process is performed upon the client device and executing steps (r) to (w);

o) upon determining the condition is not met determining whether another device is associated with at least one of the client device and the user;
p) upon determining that there is not another device associated with at least one of the client device and the user stopping the second process;
q) upon determining that there is another device is associated with at least one of the client device and the user establishing the another device as the device such that the first process is performed upon the another device and executing steps (r) to (w);
r) receiving the indications of the user entered text for the field of the plurality of fields;
s) establishing upon receipt of each indication of user entered text a data transfer condition value with respect to an aspect of data transfer between the remote system and the client device;
t) establishing a transfer condition value with respect to the aspect of data transfer between the remote system and the client device for the user entered text based upon the current communications between the client device and the remote system;
u) determining whether a condition is met in dependence upon the transfer condition value and the threshold data transfer condition value;
v) upon determining the condition is met repeating steps (r) to (t)

w) upon determining the condition is not met generating and transmitting the message to be rendered upon the client device.

14. The method according to claim 13, wherein
the threshold current data transfer condition value is defined by a geofence or a network latency;
when the threshold current data transfer condition value is defined by the geofence the transfer condition value with respect to the aspect of data transfer between the remote system and the client device is a distance of the client device from a defined location; and
when the threshold current data transfer condition value is defined by the network latency the transfer condition value with respect to the aspect of data transfer between the remote system and the client device is a current latency of communications between the client device and the remote system.

15. The method according to claim 13, wherein
the another sequence comprising steps (k) to (p) is performed using a software application installed on the client device.

16. The method according to claim 13, wherein
the threshold current data transfer condition value is set to a value forcing the text entry onto the local device thereby suppressing communications between the client device and the remote system during the text entry process.

* * * * *